US012591449B2

(12) United States Patent
Luo et al.

(10) Patent No.: US 12,591,449 B2
(45) Date of Patent: Mar. 31, 2026

(54) MERGING STREAMS FOR CALL ENHANCEMENT IN VIRTUAL DESKTOP INFRASTRUCTURE

(71) Applicant: Zoom Communications, Inc., San Jose, CA (US)

(72) Inventors: Xingzhi Luo, Sunnyvale, CA (US); Daoquan Ye, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/669,909

(22) Filed: May 21, 2024

(65) Prior Publication Data

US 2024/0311176 A1 Sep. 19, 2024

Related U.S. Application Data

(63) Continuation of application No. 17/390,480, filed on Jul. 30, 2021, now Pat. No. 12,020,058.

(Continued)

(51) Int. Cl.
G06F 9/455 (2018.01)
H04L 65/65 (2022.01)

(52) U.S. Cl.
CPC ...... G06F 9/45558 (2013.01); G06F 9/45545 (2013.01); H04L 65/65 (2022.05);
(Continued)

(58) Field of Classification Search
CPC ............. G06F 9/45558; G06F 9/45545; G06F 2009/4557; G06F 2009/45595; H04L 65/65
See application file for complete search history.

(56) References Cited

U.S. PATENT DOCUMENTS 6,094,437 A * 7/2000 Loehndorf, Jr. .... H04L 12/4641
370/420
6,208,640 B1 * 3/2001 Spell ...................... H04L 47/10
370/468

(Continued)

OTHER PUBLICATIONS

Microsoft Teams on Windows Virtual Desktop—Azure, Use Microsoft Teams on windows Virtual desktop, https://docs.microsoft.com/en-us/azure/virtual-desktop/teams-on-wvd, Nov. 10, 2020, 7 pages.
(Continued)

*Primary Examiner* — Dong U Kim
(74) *Attorney, Agent, or Firm* — Young Basile Hanlon & MacFarlane, P.C.

(57) ABSTRACT

Calls run through a virtual desktop infrastructure server are enhanced by opening a media channel between a personal computing device and a media server for a call initiated using a virtual desktop infrastructure server. A first stream of media data for the call is merged with a second stream of media data for the call in a single virtual channel of the protocol using a first packet queue to store packets of the first stream and a second packet queue to store packets of the second stream as the packets await transmission. A first packet of media data of the first stream is pushed into the first packet queue. A fill level of the first packet queue is compared to a first congest threshold associated with the first packet queue. Responsive to the fill level exceeding the first congest threshold, a congestion mitigation measure is invoked.

20 Claims, 15 Drawing Sheets

Related U.S. Application Data

(60) Provisional application No. 63/218,375, filed on Jul. 4, 2021.

(52) U.S. Cl.
    CPC ............... *G06F 2009/4557* (2013.01); *G06F 2009/45595* (2013.01)

(56)                References Cited

U.S. PATENT DOCUMENTS

| | | | | |
|---|---|---|---|---|
| 8,351,327 | B1 * | 1/2013 | Binns | .................... H04L 67/148 |
| | | | | 370/229 |
| 9,049,271 | B1 * | 6/2015 | Hobbs | .............. H04N 21/64769 |
| 10,250,662 | B1 * | 4/2019 | O'Connell | .............. H04L 65/61 |
| 2009/0307383 | A1 * | 12/2009 | Joiner | ..................... H04M 3/56 |
| | | | | 710/16 |
| 2010/0293287 | A1 * | 11/2010 | Kobayashi | ............ H04L 65/613 |
| | | | | 709/231 |
| 2012/0297383 | A1 * | 11/2012 | Meisner | .............. G06F 9/45558 |
| | | | | 718/1 |
| 2015/0082178 | A1 * | 3/2015 | Summers | ............... G09G 5/363 |
| | | | | 715/733 |
| 2016/0295265 | A1 | 10/2016 | Li et al. | |
| 2019/0356701 | A1 | 11/2019 | Prabhu et al. | |
| 2020/0089898 | A1 * | 3/2020 | Borkar | .................... G06F 21/44 |
| 2020/0162356 | A1 * | 5/2020 | Momchilov | ........ H04L 41/5067 |
| 2021/0373676 | A1 * | 12/2021 | Jorasch | ................... G06F 3/167 |
| 2022/0214898 | A1 * | 7/2022 | Borkar | .................... G06F 9/452 |
| 2022/0385699 | A1 * | 12/2022 | Gupta | .................... H04L 67/08 |

OTHER PUBLICATIONS

Wikipedia, Independent Computing Architecture, https://en.wikipedia.org/wiki/Independent_Computing_Architecture, Jan. 6, 2021, 2 pages.

Citrix ICA Virtual Channels Overview, https://support.citrix.com/article/CTX116890, Aug. 15, 2014, 7 pages.

VMWre, Configuring Media Optimization for Microsoft Teams, https://docs.vmware.com/en/VMware-Horizon/2006/horizon-remote-desktop-features/GUID-F68FA7BB-B08F-4EFF-9BB1-1F9FC71F8214.html, Jul. 23, 2020, 4 pages.

Delivering Softphones with Virtual Apps and Desktops, https://support.citrix.com/article/CTX133024, Feb. 6, 2014, 12 pages.

Terminal Server (RDS)/Citrix Media Offload for Windows App?, Matt B. Syd, https://www.3cx.com/community/threads/terminal-server-rds-citrix-media-offload-for-windows-app.72355/, Apr. 9, 2020, 4 pages.

Citrix, Product Documentation, Optimization for Microsoft Teams, Dec. 16, 2020, 20 pages.

Zoom Blog, Zoom Optimizes Meetings for VDI, David Flores, https://blog.zoom.us/zoom-optimizes-meetings-for-vdi/, Apr. 17, 2020, 4 pages.

Zoom A/V Offloading for Citrix Virtual Desktops Part 1, Leading Hybrid Workplace Transformation & Employee Experiences with Co-Innovation, Co-Collaboration, El & Empathy, Lyndon-Jon Martin, axendatacentre.com/blog/2020/04/22/zoom-hdx-offloading-for-citrix-virtual-desktops-part-1/, Apr. 22, 2020, 4 pages.

International Search Report and Written Opinion mailed on Sep. 30, 2022 in corresponding PCT Application No. PCT/US2022/035805.

* cited by examiner

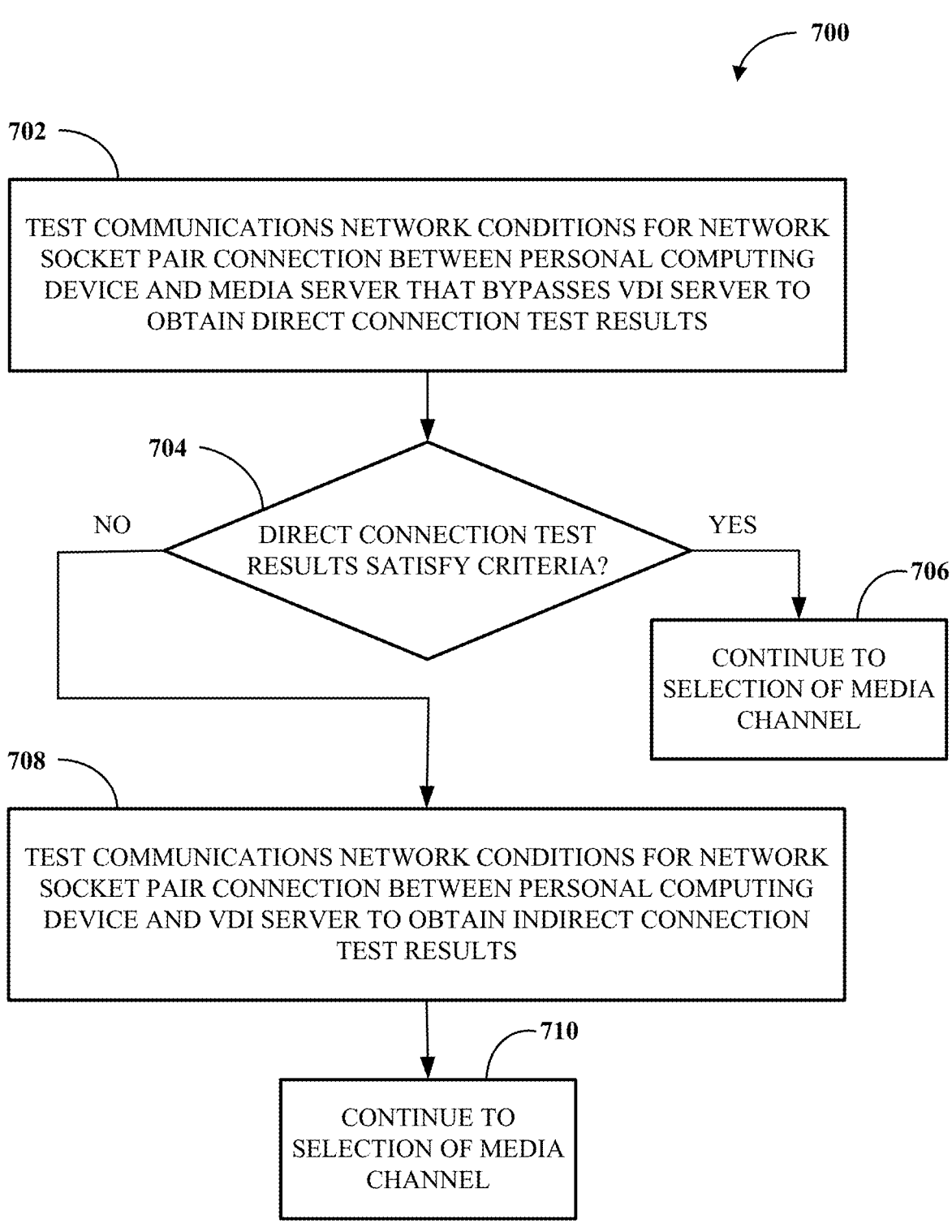

700

702

TEST COMMUNICATIONS NETWORK CONDITIONS FOR NETWORK SOCKET PAIR CONNECTION BETWEEN PERSONAL COMPUTING DEVICE AND MEDIA SERVER THAT BYPASSES VDI SERVER TO OBTAIN DIRECT CONNECTION TEST RESULTS

704

NO    DIRECT CONNECTION TEST RESULTS SATISFY CRITERIA?    YES

706

CONTINUE TO SELECTION OF MEDIA CHANNEL

708

TEST COMMUNICATIONS NETWORK CONDITIONS FOR NETWORK SOCKET PAIR CONNECTION BETWEEN PERSONAL COMPUTING DEVICE AND VDI SERVER TO OBTAIN INDIRECT CONNECTION TEST RESULTS

710

CONTINUE TO SELECTION OF MEDIA CHANNEL

FIG. 7

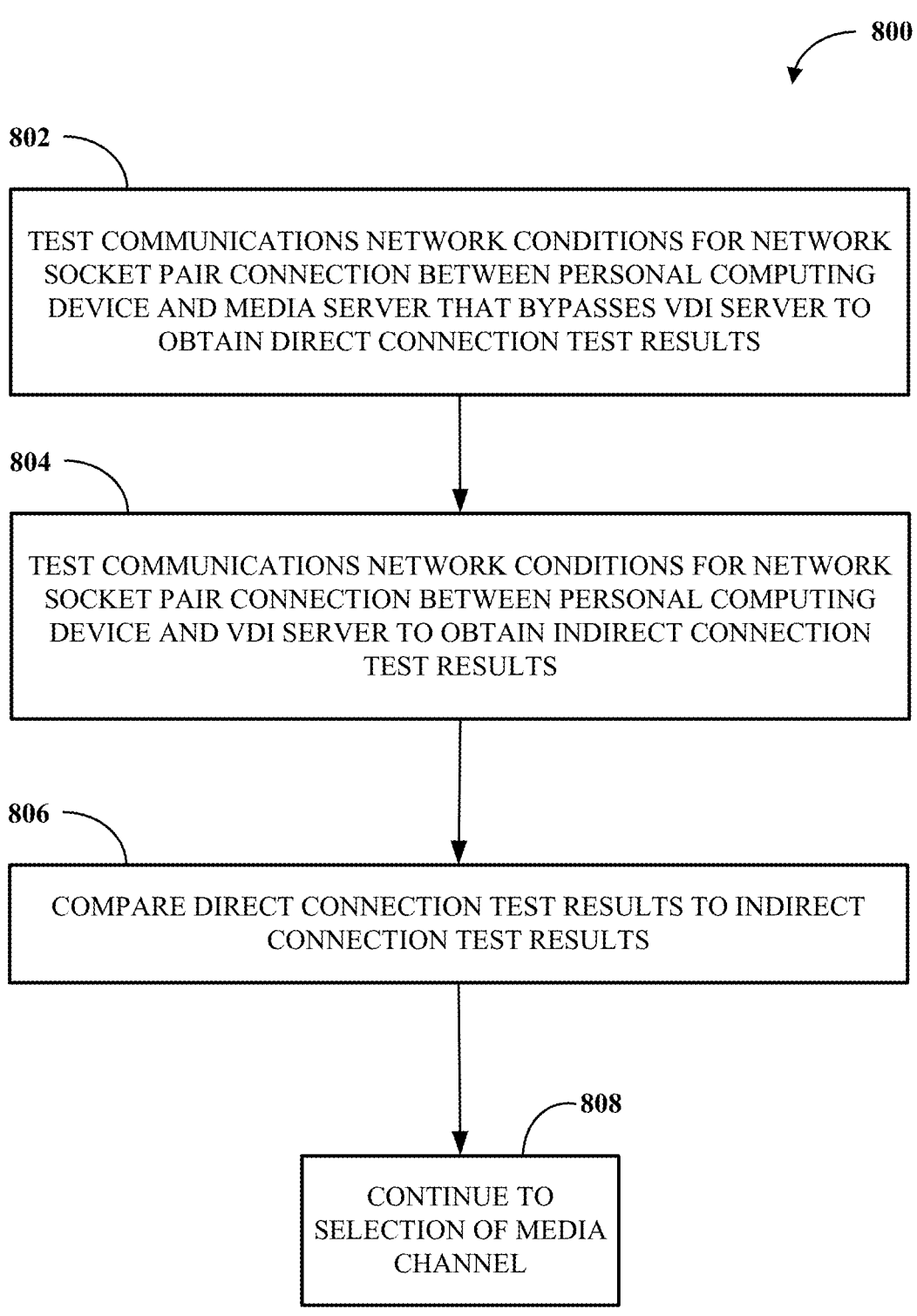

800

802

TEST COMMUNICATIONS NETWORK CONDITIONS FOR NETWORK SOCKET PAIR CONNECTION BETWEEN PERSONAL COMPUTING DEVICE AND MEDIA SERVER THAT BYPASSES VDI SERVER TO OBTAIN DIRECT CONNECTION TEST RESULTS

804

TEST COMMUNICATIONS NETWORK CONDITIONS FOR NETWORK SOCKET PAIR CONNECTION BETWEEN PERSONAL COMPUTING DEVICE AND VDI SERVER TO OBTAIN INDIRECT CONNECTION TEST RESULTS

806

COMPARE DIRECT CONNECTION TEST RESULTS TO INDIRECT CONNECTION TEST RESULTS

808

CONTINUE TO SELECTION OF MEDIA CHANNEL

FIG. 8

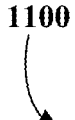
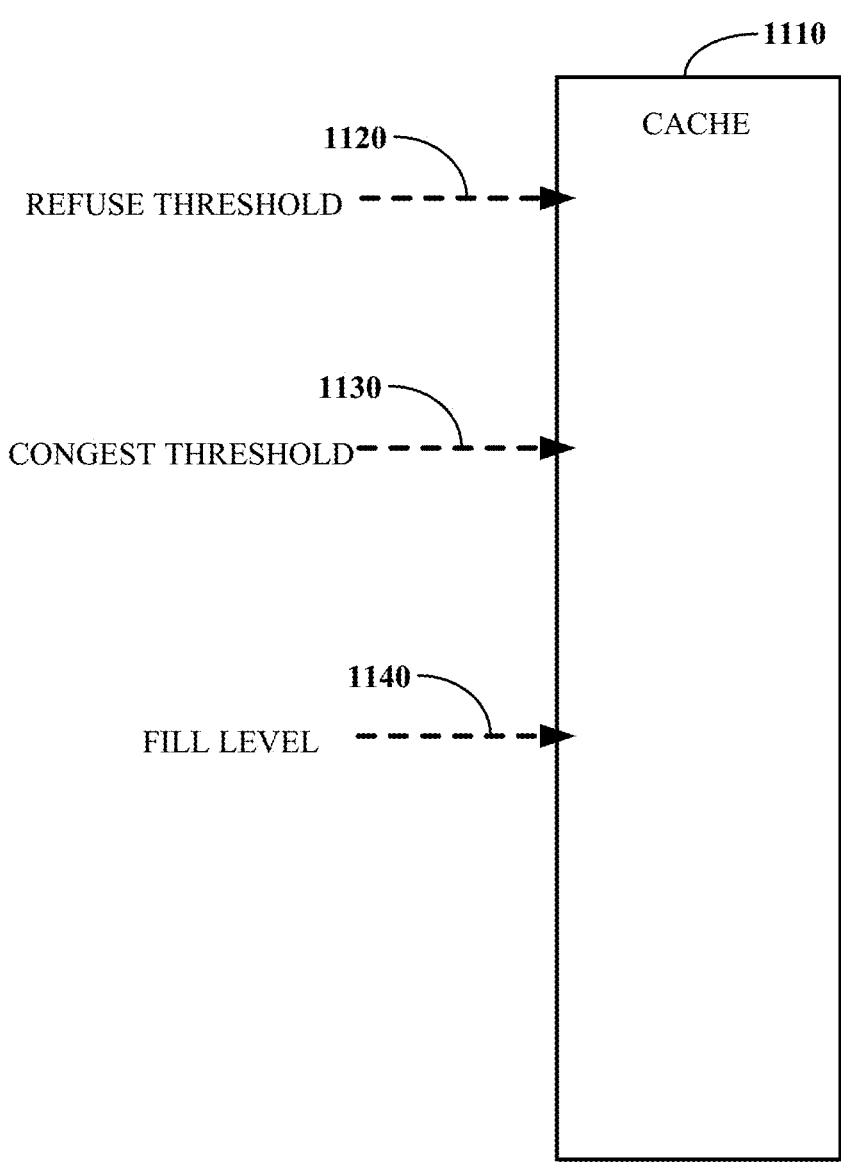
FIG. 11

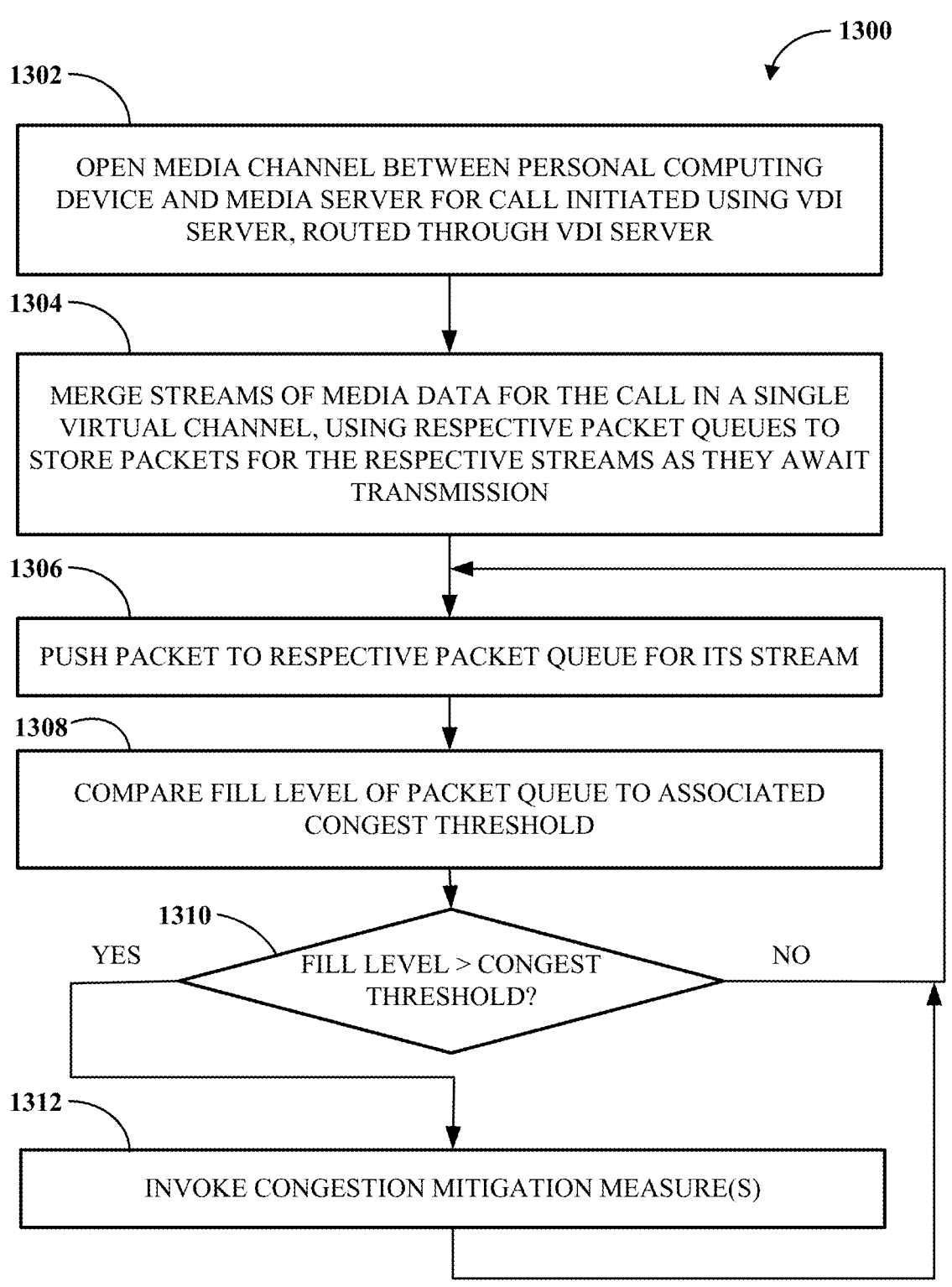

1300

1302
OPEN MEDIA CHANNEL BETWEEN PERSONAL COMPUTING DEVICE AND MEDIA SERVER FOR CALL INITIATED USING VDI SERVER, ROUTED THROUGH VDI SERVER

1304
MERGE STREAMS OF MEDIA DATA FOR THE CALL IN A SINGLE VIRTUAL CHANNEL, USING RESPECTIVE PACKET QUEUES TO STORE PACKETS FOR THE RESPECTIVE STREAMS AS THEY AWAIT TRANSMISSION

1306
PUSH PACKET TO RESPECTIVE PACKET QUEUE FOR ITS STREAM

1308
COMPARE FILL LEVEL OF PACKET QUEUE TO ASSOCIATED CONGEST THRESHOLD

1310
FILL LEVEL > CONGEST THRESHOLD?
YES
NO

1312
INVOKE CONGESTION MITIGATION MEASURE(S)

REDUCE ENCODER DATA RATE FOR THE STREAM OF MEDIA DATA THAT THE PACKET IS FROM

1404

REDUCE ENCODER DATA RATE(S) FOR STREAM(S) OF MEDIA DATA OTHER THAN THE STREAM THAT THE PACKET IS FROM

1406

TRANSMIT CONGESTION INDICATION MESSAGE(S) TO MEDIA SERVER

MERGING STREAMS FOR CALL ENHANCEMENT IN VIRTUAL DESKTOP INFRASTRUCTURE

CROSS-REFERENCE TO RELATED APPLICATION(S)

This application is a continuation of U.S. application Ser. No. 17/390,480, filed Jul. 30, 2021, which claims the benefit of U.S. Provisional Application No. 63/218,375, filed on Jul. 4, 2021, which is incorporated herein by reference in its entirety.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for merging streams in a virtual channel for call enhancement in virtual desktop infrastructure.

One aspect of this disclosure is a method including opening a media channel between a personal computing device and a media server for a call initiated using a virtual desktop infrastructure server, wherein the media channel is routed through the virtual desktop infrastructure server and encapsulated in a protocol for exchanging data for virtual desktop applications; merging a first stream of media data for the call with a second stream of media data for the call in a single virtual channel of the protocol using a first packet queue to store packets of the first stream and a second packet queue to store packets of the second stream, wherein the first packet queue is associated with a first congest threshold; pushing a first packet of media data of the first stream into the first packet queue; comparing a fill level of the first packet queue to the first congest threshold; and, responsive to the fill level exceeding the first congest threshold, invoking a congestion mitigation measure.

One aspect of this disclosure is a personal computing device, including a network interface, a processor, and a memory, wherein the memory stores instructions executable by the processor to: open a media channel between a personal computing device and a media server for a call initiated using a virtual desktop infrastructure server, wherein the media channel is routed through the virtual desktop infrastructure server and encapsulated in a protocol for exchanging data for virtual desktop applications; merge a first stream of media data for the call with a second stream of media data for the call in a single virtual channel of the protocol using a first packet queue to store packets of the first stream and a second packet queue to store packets of the second stream, wherein the first packet queue is associated with a first congest threshold; push a first packet of media data of the first stream into the first packet queue; compare a fill level of the first packet queue to the first congest threshold; and, responsive to the fill level exceeding the first congest threshold, invoke a congestion mitigation measure.

One aspect of this disclosure is a non-transitory computer-readable storage medium, comprising executable instructions that, when executed by a processor, facilitate performance of operations, including opening a media channel between a personal computing device and a media server for a call initiated using a virtual desktop infrastructure server, wherein the media channel is routed through the virtual desktop infrastructure server and encapsulated in a protocol for exchanging data for virtual desktop applications; merging a first stream of media data for the call with a second stream of media data for the call in a single virtual channel of the protocol using a first packet queue to store packets of the first stream and a second packet queue to store packets of the second stream, wherein the first packet queue is associated with a first congest threshold; pushing a first packet of media data of the first stream into the first packet queue; comparing a fill level of the first packet queue to the first congest threshold; and responsive to the fill level exceeding the first congest threshold, invoking a congestion mitigation measure.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is a flowchart of an example of a technique for testing communications network conditions for network socket pair connections in a system configured to enable calls using a virtual desktop instance.

FIG. 8 is a flowchart of an example of a technique for testing communications network conditions for network socket pair connections in a system configured to enable calls using a virtual desktop instance.

FIG. 11 is an illustration of an example of a set of packet queue showing with a congestion threshold and a refuse threshold.

FIG. 13 is a flowchart of an example of a technique for transmitting packets for a call from multiple streams using packet queues with a congest threshold.

DETAILED DESCRIPTION

Figure 1:
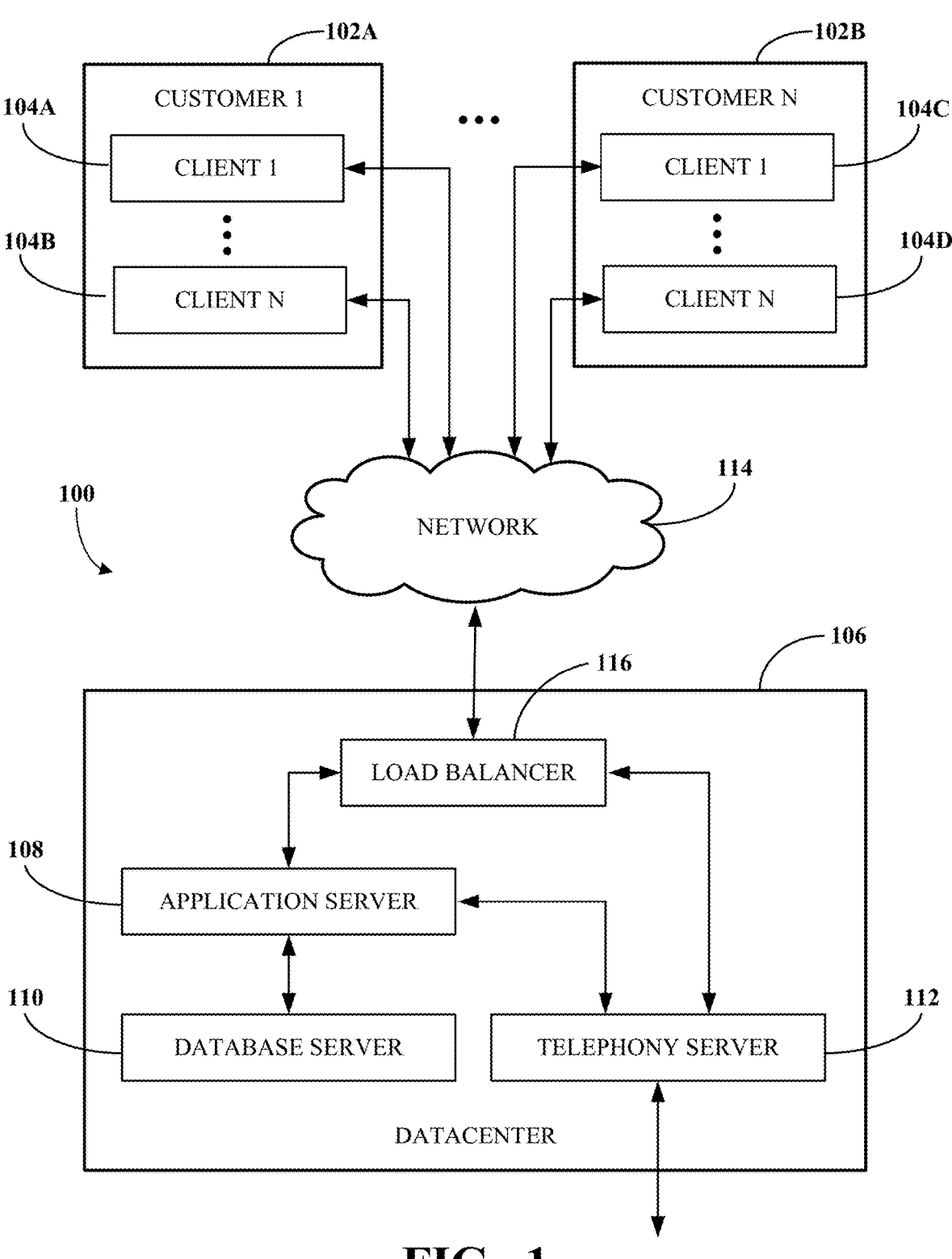
FIG. 1 is a block diagram of an example of an electronic computing and communications system.

A service often offered to large groups of users remotely is virtual desktop infrastructure (VDI), which allows user access to a desktop interface that is provided by a server. This desktop interface provides access to applications that run on the operating system used by a virtual desktop instance, which may be a different operating system than that used by a personal computing device that a person uses to remotely access the virtual desktop.

Client software for a UCaaS platform can be run on a virtual desktop instance. In some examples, UCaaS client software running on a VDI server can be used to facilitate the participation of a user in calls (e.g., video conferencing calls or voice-only calls) from their personal computing device that is connected to the VDI server. The VDI server may relay some or all data used to facilitate the call between one or more servers of a UCaaS platform and the user's personal computing device. It is advantageous in some circumstances to route media data (e.g., audio and/or video data) for a call more directly between a media server of the UCaaS platform and the personal computing device to bypass the VDI server. This practice is often referred to as media offloading. In appropriate circumstances, media off-loading can conserve computing resources on the VDI server, conserve network bandwidth that would otherwise be used to relay the media data for the call, which can be a relatively high data rate, and reduce latency in the call, which can be a significant factor in perceived call quality. This comes at the expense of an increase in the use of processing resources on the personal computing device, which has to run media coders and decoders for the media streams locally. However, in some circumstances, media offloading can degrade call quality.

Implementations of this disclosure address problems such as these by enabling a personal computing device that is entering a call setup by client software running in a VDI server to test the communication network conditions and select a media channel for transferring media data of the call from a set of supported media channels to suit the current conditions. In some examples, the set of supported media channels may include (1) a relatively direct connection to the media server that bypasses the VDI server and uses a network socket pair connection (e.g., using a User Datagram Protocol (UDP) socket pair) between the media server and the personal computing device; (2) a second media channel that is routed through the VDI server and encapsulated in a protocol (e.g., the Independent Computing Architecture (ICA) protocol or the Remote Desktop Protocol (RDP) protocol) for exchanging data for virtual desktop applications; and/or (3) a third media channel using a network socket pair connection (e.g., using a UDP socket pair) between the personal computing device and the VDI server. In some implementations, the more direct connection using the first media channel is preferred and may be used whenever test results for this direct connection satisfy a criterion (e.g., sufficient data throughput and/or low enough latency). In some implementations, the third media channel is preferred to the second media channel, and the second media channel is selected when the first media channel is unavailable, and the third media channel satisfies a criterion. If both the first media channel and the third media channel are unavailable, then the second media channel may be selected. In some implementations, test results for multiple supported media channels may be compared to each other and a media channel may be selected based on the comparison.

In a first example scenario, a number of factors may be compared for the first media channel, the second media channel, and the third media channel, and the best media channel may be selected. In a second example scenario, a user is presented with all the data, or some simplified portion of the data, and the user is enabled to select which media channel is used. In an example, if multiple people are on a conference call watching a video, and some of them are experiencing poor quality, the system can either automatically switch to a better connection or the users can manually change the media channel (and review factors related to that change).

When the second media channel (which is routed through the VDI server and encapsulated in a protocol (e.g., the ICA protocol or the RDP protocol) for exchanging data for virtual desktop applications) is used, it can be advantageous to conserve the number of virtual channels of the protocol that are used by a given call. In some examples, multiple media streams (e.g., from different call participants) may be merged into a single virtual channel of the protocol. In some implementations, all of the data exchanged during the call (e.g., including control data, audio data, video data, and share data) may be merged into a single virtual channel of the protocol. Conserving virtual channel usage may enable a VDI system to support a high volume of calls, making the system more scalable. Merging different types of call data into a single virtual channel of the protocol may also enable custom prioritization of the various traffic types by a phone agent or a meeting agent.

The second media channel may be used to send and receive data of four types between a plugin running on a personal computing device and the VDI client running on the VDI server: command/signal, audio, video, and share (e.g., for screen sharing in a conference call). Conventional implementations have used separate virtual channels of the VDI protocol (e.g., ICA virtual channels) for each type of call data and rely on VDI protocol mechanisms to allocate quality of service between the types of call data. The number of virtual channels of the protocol that can be used for calls is limited. It may be beneficial to reduce the number of virtual channels used to support a call while maintaining or improving quality of service for the path between the personal computing device (e.g., a thin client) and the VDI server. In some implementations, the data types transferred via a shared virtual channel may be assigned priorities. In some examples, Command/signal data may be assigned a highest priority level, audio data may be assigned a high priority level, share data may be assigned a medium priority level, and video data may be assigned a low priority level. In some examples, it may be acceptable to drop packets of media data (e.g., audio, share, or video) and unacceptable to intentionally drop command/signal data.

Some implementations described herein address quality of service issues for the path in the second media channel between the plugin running on the personal computing device (e.g., a thin client) and the VDI client running on the VDI server. A connection may be established between a media server (e.g., a private branch exchange (PBX) or multimedia router (MMR)) and a thin client to support a call in which a user of the thin client will participate. The connection is established via a VDI server. Call data of various types (e.g., command/control, audio, video, and share) are sent between the thin client running a conference call plugin and a conference call VDI client running on the VDI server via a single virtual channel of a protocol (e.g., the ICA protocol or the RDP protocol) for exchanging data for virtual desktop applications. Each data type may have its own send queue. In some examples, four thread safe data queues may be used to maintain the outgoing data queues for each of the four different data types. The send queues may have one or more fill thresholds, including a congestion threshold, that governs quality of service enhancement measures. In some examples, when a congestion threshold in a send buffer is exceeded, a congestion flag may be set in a channel state maintained by the plugin. This congestion flag may trigger one or more congestion mitigation measures, such as reducing the encoder data rate for one or more types of media data in the call and/or sending a congestion message to the media server and/or the VDI server. In some implementations, a send buffer also has a refuse threshold. When the fill level for the send buffer exceeds the refuse threshold, packets of data may be dropped.

Some implementations may provide advantages, such as reducing the number of virtual channels (e.g., ICA virtual channels) needed to support a call and improving quality of service (QOS).

To describe some implementations in greater detail, reference is first made to examples of hardware and software structures for merging streams in a virtual channel for call enhancement in virtual desktop infrastructure. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based PBX system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server

112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
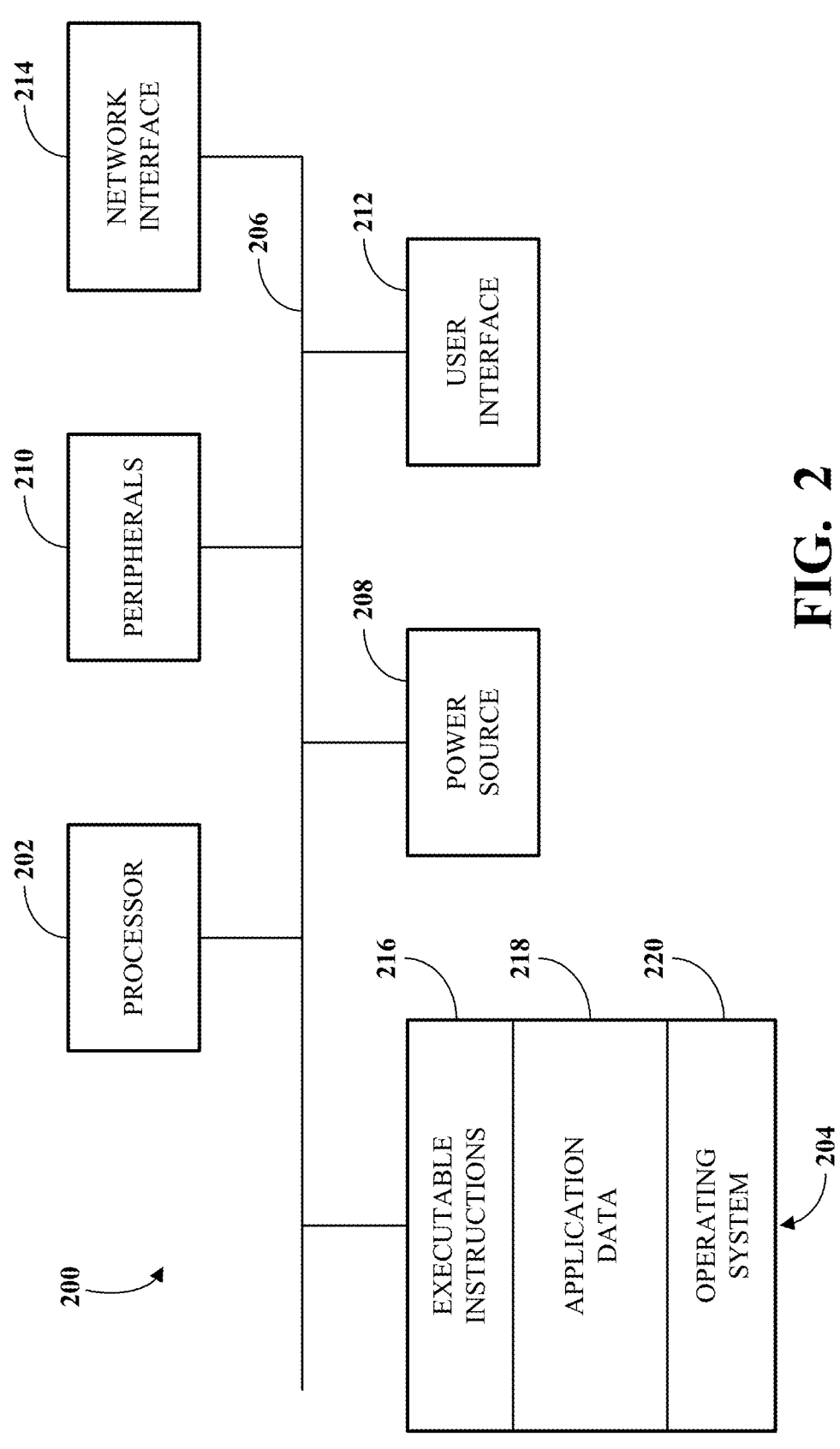
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, phase-change memory, or another form of non-volatile memory configured for persistent electronic information storage. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
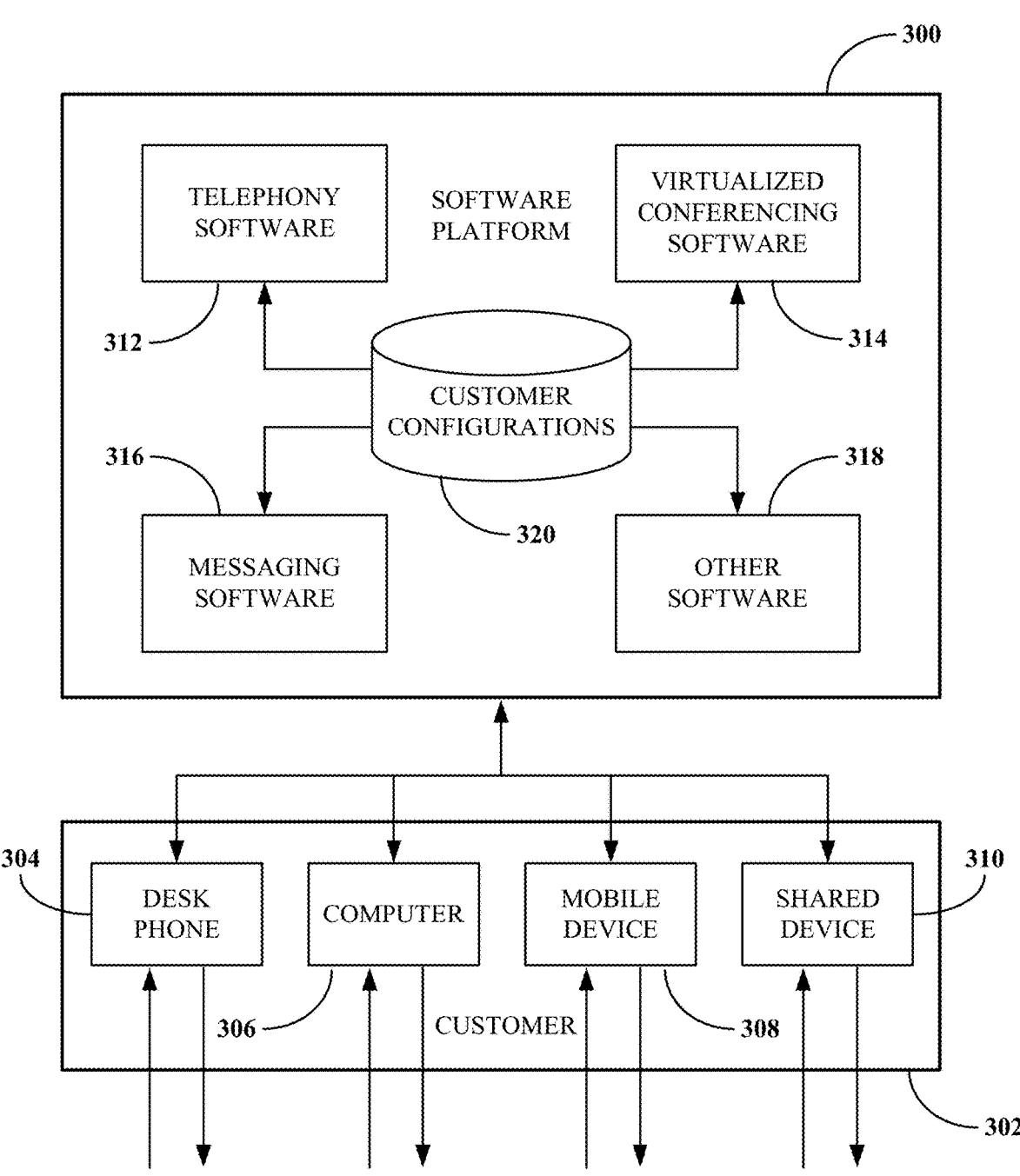
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone, a softphone running on the computer, a mobile application running on the mobile device, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include code for selecting a media channel from a set of options for a call made using virtual desktop infrastructure in order to enhance the call, and/or merging streams in a virtual channel for call enhancement in virtual desktop infrastructure.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
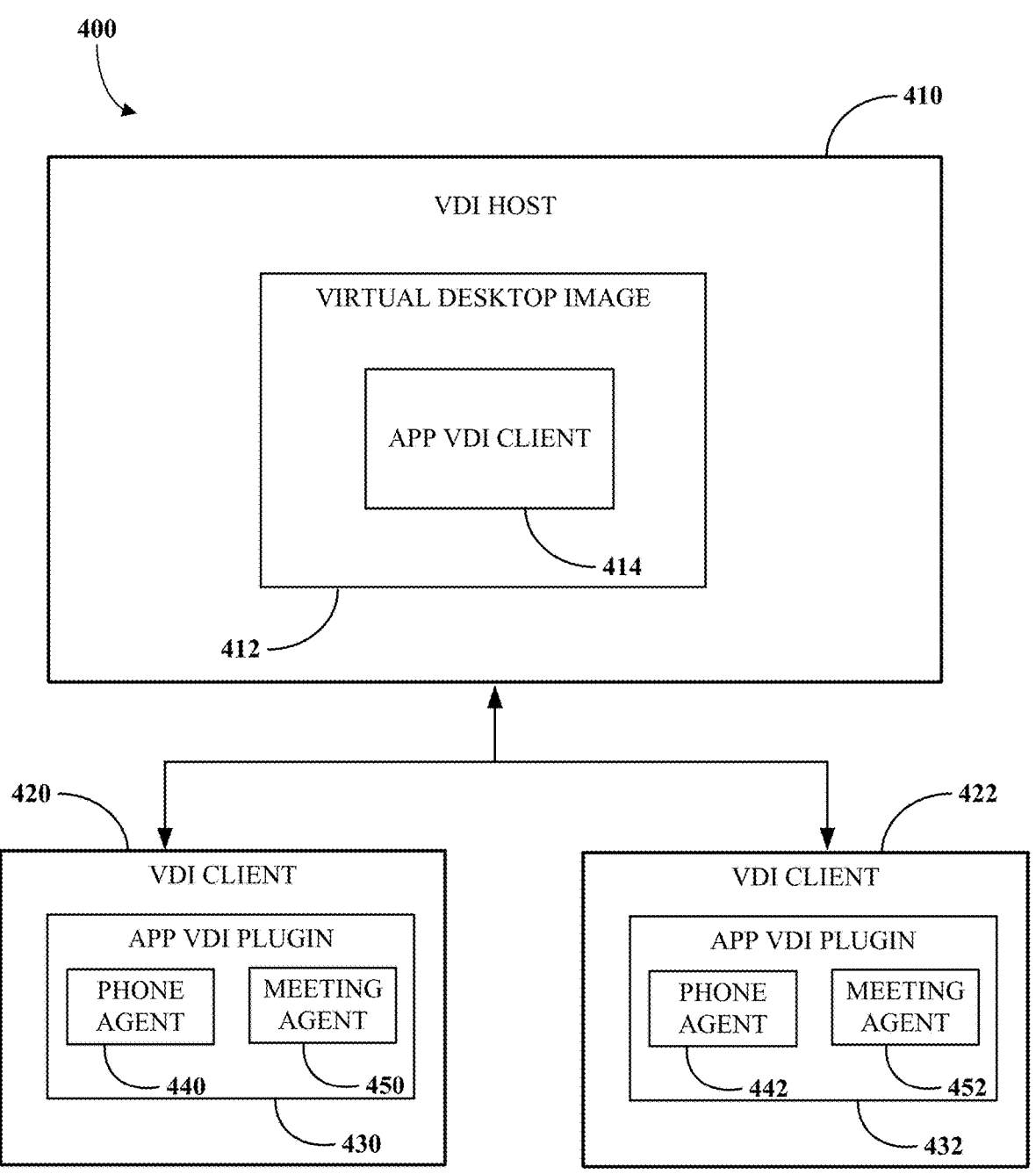
FIG. 4 is a block diagram of an example of a virtual desktop infrastructure system configured to enable calls using a virtual desktop instance.

FIG. 4 is a block diagram of an example of a virtual desktop infrastructure system 400 configured to enable calls using a virtual desktop instance. The virtual desktop infrastructure system 400 includes a virtual desktop infrastructure host 410, a virtual desktop infrastructure client 420 (e.g., a VDI thin client), and a virtual desktop infrastructure client 422. A virtual desktop image 412, which includes an application virtual desktop infrastructure client 414, is provided by the virtual desktop infrastructure host 410. The virtual desktop infrastructure client 420 includes an application virtual desktop infrastructure plugin 430, which includes a phone agent 440 and a meeting agent 450. The virtual desktop infrastructure client 422 includes an application virtual desktop infrastructure plugin 432, which includes a phone agent 442 and a meeting agent 452. Note that in practice the virtual desktop infrastructure host 410 may support many more virtual desktop infrastructure clients than the two depicted in FIG. 4. In some implementations, the virtual desktop infrastructure system 400 may be used to implement the technique 600 of FIG. 6. For example, the technique 600 of FIG. 6 may be implemented by the virtual desktop infrastructure client 420 or the virtual desktop infrastructure client 422.

Calls may be supported in the virtual desktop infrastructure system 400 by the cooperation of the application virtual desktop infrastructure client 414 with a virtual desktop infrastructure plugin (430 or 432). For example, a call may include streaming of audio from two or more participants, including a user of the virtual desktop infrastructure client 420 being used to place or answer the call using the phone agent 440. In another example, a call may include streaming of audio and video from two or more participants, including a user of the virtual desktop infrastructure client 420 being used to host or attend the call using the meeting agent 450, which may facilitate video calls/conferencing.

The application virtual desktop infrastructure client 414 is installed in the virtual desktop image 412 that is instantiated on the virtual desktop infrastructure host 410. The virtual desktop infrastructure plugin 430 is installed in the virtual desktop infrastructure client 420. In an implementation, the virtual desktop infrastructure client 420 may run on a personal computing device (e.g., a laptop, smartphone, or a tablet). The virtual desktop infrastructure client 420 may run on a different operating system (e.g., Windows, OS X, Linux, or Android) than the virtual desktop image 412 and the virtual desktop infrastructure client 420 may run on a different operating system than other virtual desktop infrastructure clients. For example, the virtual desktop infrastructure client 420 may run on Windows and the virtual desktop infrastructure client 422 may run on Linux. As a result, the virtual desktop infrastructure plugin 430, the phone agent 440, and the meeting agent 450 are Windows versions of these software; while the virtual desktop infrastructure plugin 432, the phone agent 442, and the meeting agent 452 are a Linux version of these software. In some implementations, phone agents 440 and 442 are just different instances of the same software components. In some implementations, meeting agents 450 and 452 are just different instances of the same software components. The virtual desktop infrastructure system 400 may enable a wide variety of devices to access the call functionality provided by the application virtual desktop infrastructure client 414.

Figure 5:
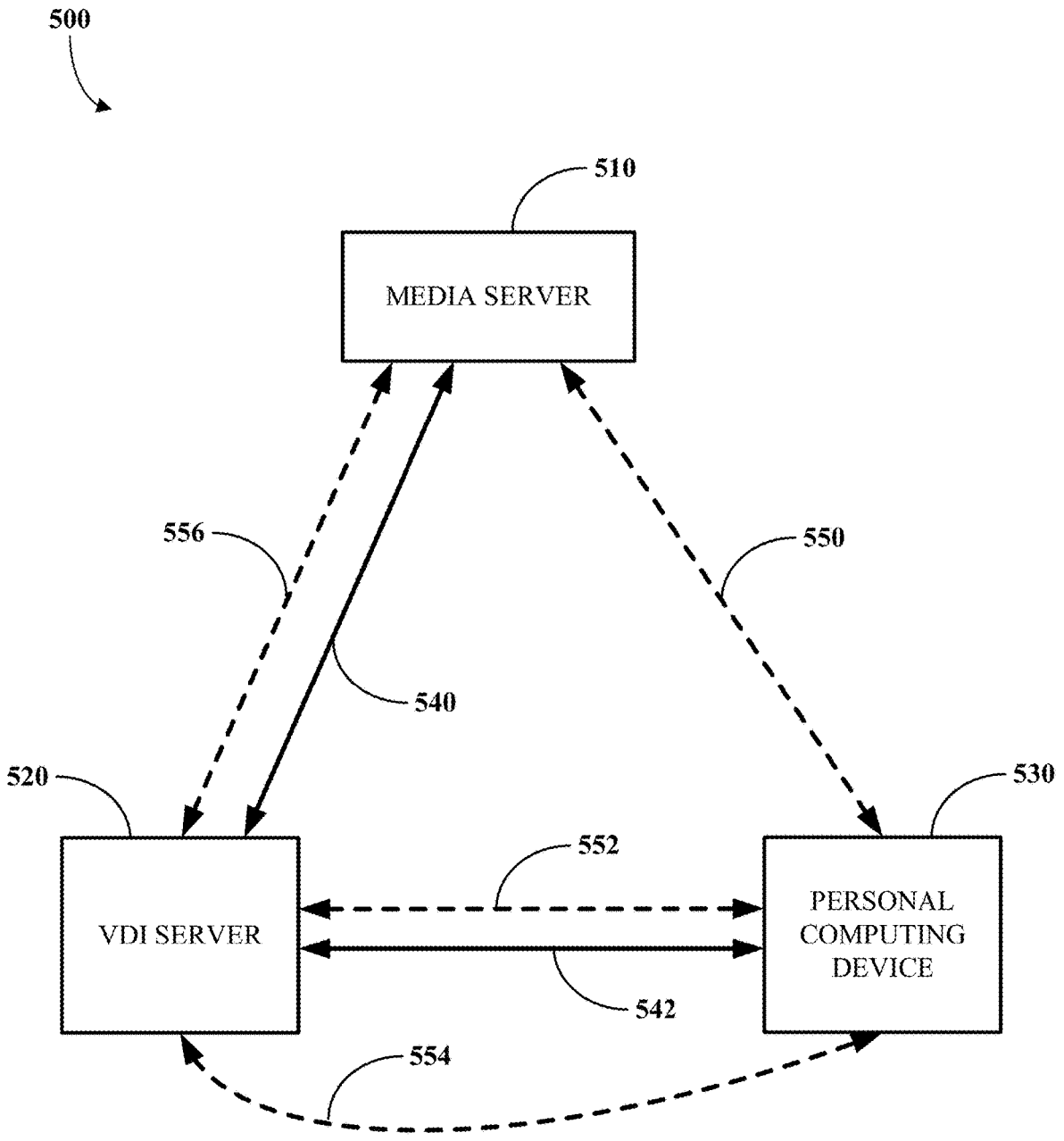
FIG. 5 is a block diagram of an example of a system configured to enable calls using a virtual desktop instance that illustrates the flow of media data to support a call.

FIG. 5 is a block diagram of an example of a system 500 configured to enable calls using a virtual desktop instance that illustrates the flow of media data to support a call. The system 500 includes a media server 510, a virtual desktop infrastructure server 520, and a personal computing device 530. In an implementation, the system 500 may be used to implement the technique 600 of FIG. 6. The technique 600 of FIG. 6 may implemented by the personal computing device 530.

The media server 510 may be the telephone server 112. In some implementations, the media server 510 is a PBX server. In some implementations, the media server 510 is an MMR server.

As an example, the virtual desktop infrastructure server 520 may run the virtual desktop infrastructure host 410, including one or more virtual desktop images that have the application virtual desktop infrastructure client 414 installed. In an implementation, the virtual desktop infrastructure server 520 may include a computing device, such as the computing device 200 of FIG. 2.

The personal computing device 530 may be a laptop, a smartphone, a tablet, or another type of device. In an implementation, the personal computing device 530 may be one of the clients 304 through 310. The personal computing device 530 may run a virtual desktop infrastructure client (e.g., the virtual desktop infrastructure client 420) that includes an application virtual desktop infrastructure plugin with a phone agent and/or a meeting agent for participating in calls. In some implementations, a virtual desktop infrastructure client (e.g., a VDI thin client) running on the personal computing device 530 acts as a slave and a virtual desktop infrastructure host running on the virtual desktop infrastructure server 520 acts as a master in a master/slave interaction to facilitate a call. The personal computing device 530 may include a computing device, such as the computing device 200 of FIG. 2.

A call may be initiated by the virtual desktop infrastructure server 520 in response to a request from the personal computing device 530 (e.g., caused by input from a user such as dialing) or in response to an inbound call message from the media server 510 or an associated server that supports calls using the media server 510. As part of the setup for the call, commands or other control data may be exchanged between the media sever 510 and the virtual desktop infrastructure server 520 via a control channel 540 through a communications network. In an implementation, the control channel 540 may utilize a cryptographic protocol such as Transport Layer Security (TLS) 1.2 or Secure Sockets Layer (SSL). The virtual desktop infrastructure server 520 may be configured to relay some or all of the control data received, including call parameters, to the personal computing device 530 via a control channel 542. In an implementation, the control channel 542 may be encapsulated in a protocol (e.g., the ICA protocol or the RDP protocol) for exchanging data for virtual desktop applications. In particular, the virtual desktop infrastructure server 520 may pass an identifier for the media server 510 to the personal computing device 530 to facilitate the establishment of a more direct connection between the media server 510 and the personal computing device 530 that bypasses the virtual desktop infrastructure server 520 to enable media offloading.

Figure 6:
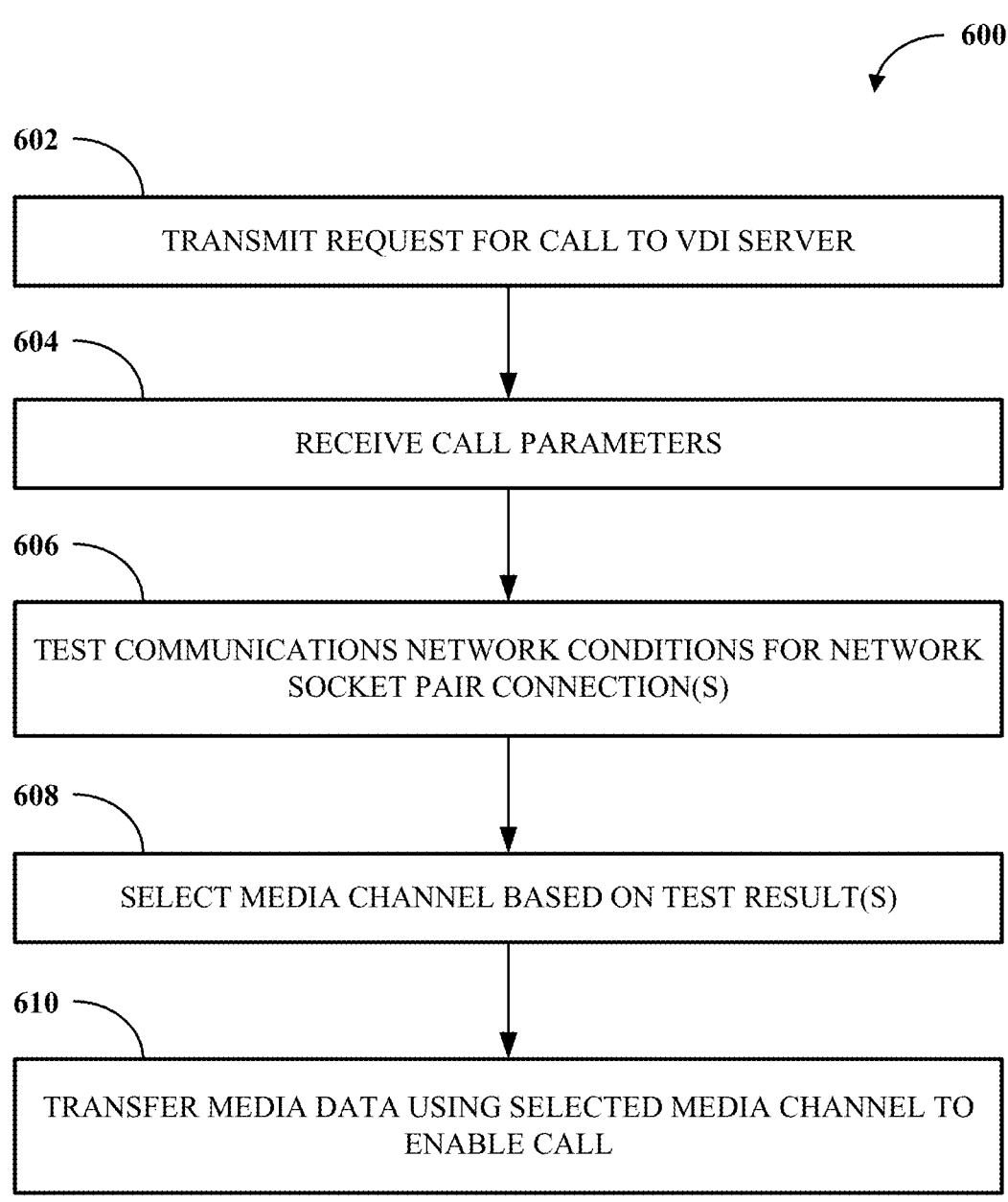
FIG. 6 is a flowchart of an example of a technique for selecting a media channel to support a call initiated using a virtual desktop infrastructure server.

The personal computing device 530 may be configured to implement the technique 600 of FIG. 6 to test the communications network conditions and select a media channel for bearing media data for the call from a set of supported media channels. The set of supported media channels may include a first media channel 550 using a network socket pair connection between the personal computing device 530 and the media server 510. The set of supported media channels may include a second media channel 552 that is routed through the virtual desktop infrastructure server 520 and encapsulated in a protocol (e.g., ICA or RDP) for exchanging data for virtual desktop applications. The set of supported media channels may include a third media channel 554 using a second network socket pair connection between the personal computing device 530 and the virtual desktop infrastructure server 520. If an indirect connection that routes media data through the virtual desktop infrastructure server 520 is used, then a media channel 556 between the virtual desktop infrastructure server 520 and the media server 510 will also be established. In an implementation, the media channels 550, 554, and/or 556 may utilize a network socket pair for their respective endpoints according to a transport protocol, such as, for example, UDP or Secure Real-time Transport Protocol (SRTP). In some implementations, a media channel (e.g., 550 or 554) may use a customized port range (e.g., UDP ports 9,000-10,000). Once a media channel has been selected for the call, the selected media channel (e.g., the media channel 550, the media channel 552, or the media channel 554) may be used for transfers between the media server 510 and the personal computing device 530 to enable the call. Selecting a media channel for the call dynamically based on tests of communications network conditions may enhance calls in the virtual desktop infrastructure system by improving resource utilization while maintaining call quality.

Figure 9:
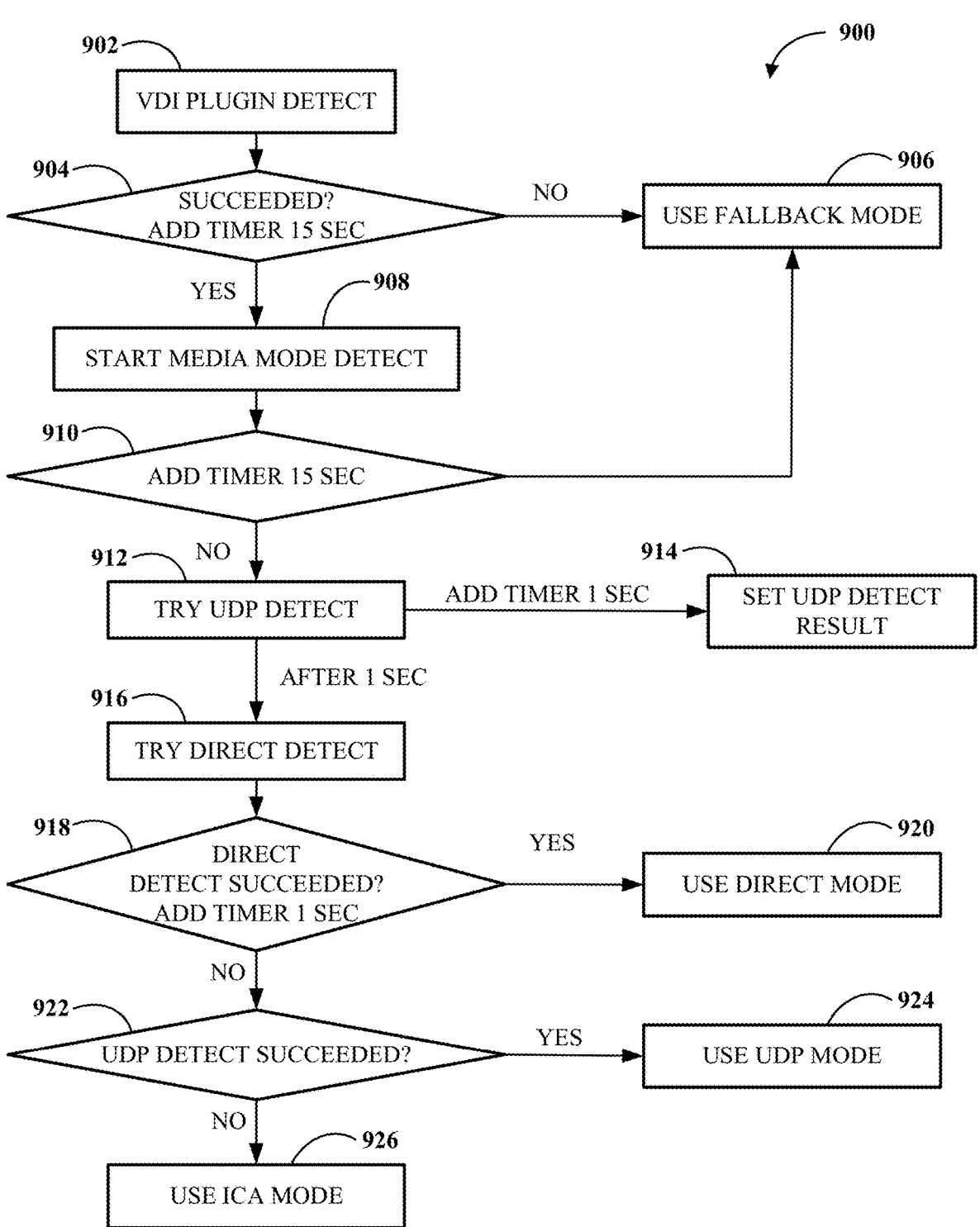
FIG. 9 is a flowchart of an example of a technique for selecting a media channel to support a call initiated using a virtual desktop infrastructure server.
Figure 12A:
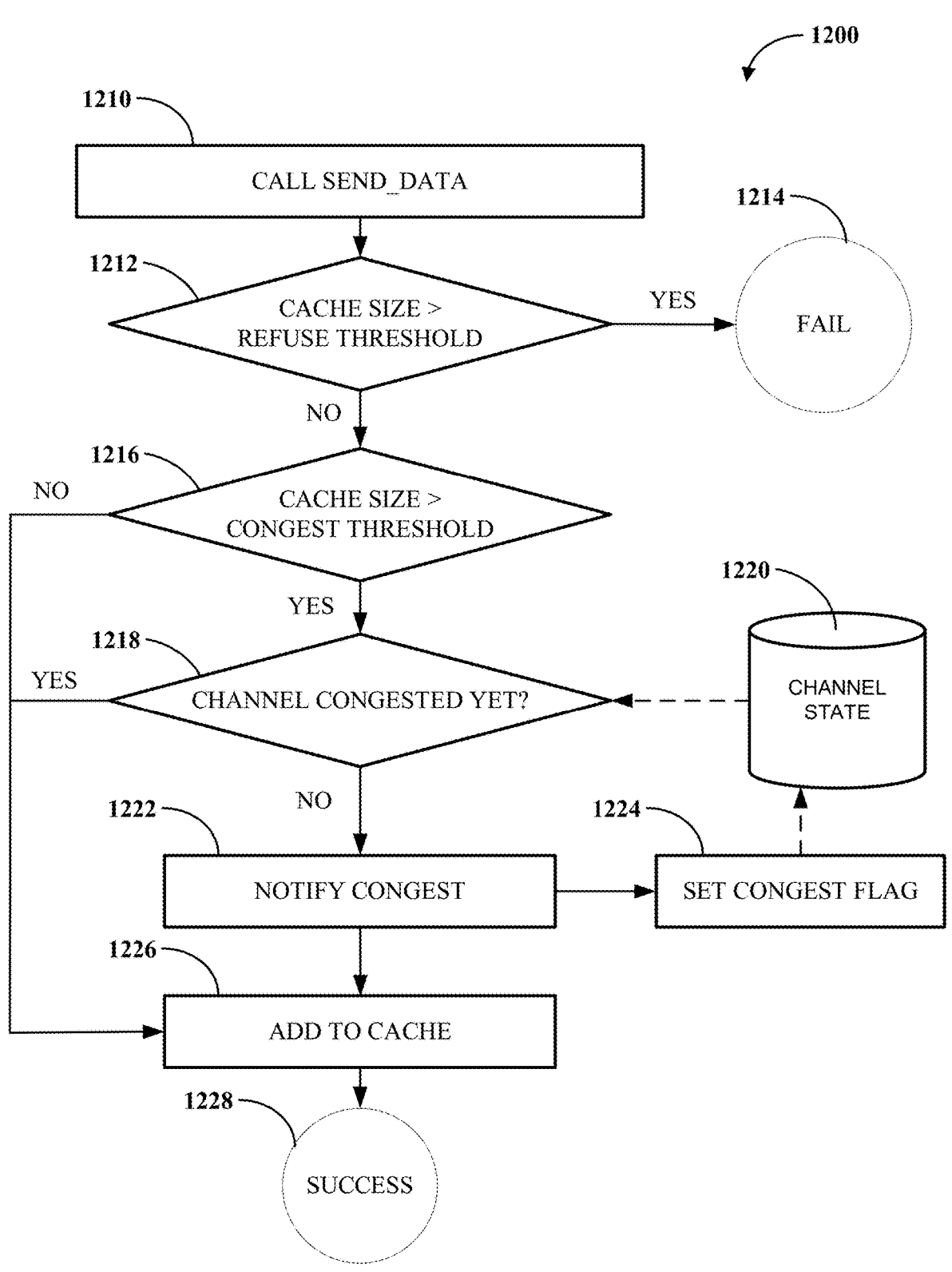
FIG. 12A is a flowchart of an example of a technique for storing packets for a call in a packet queue with a congest threshold to await transmission via a shared virtual channel.
Figure 12B:
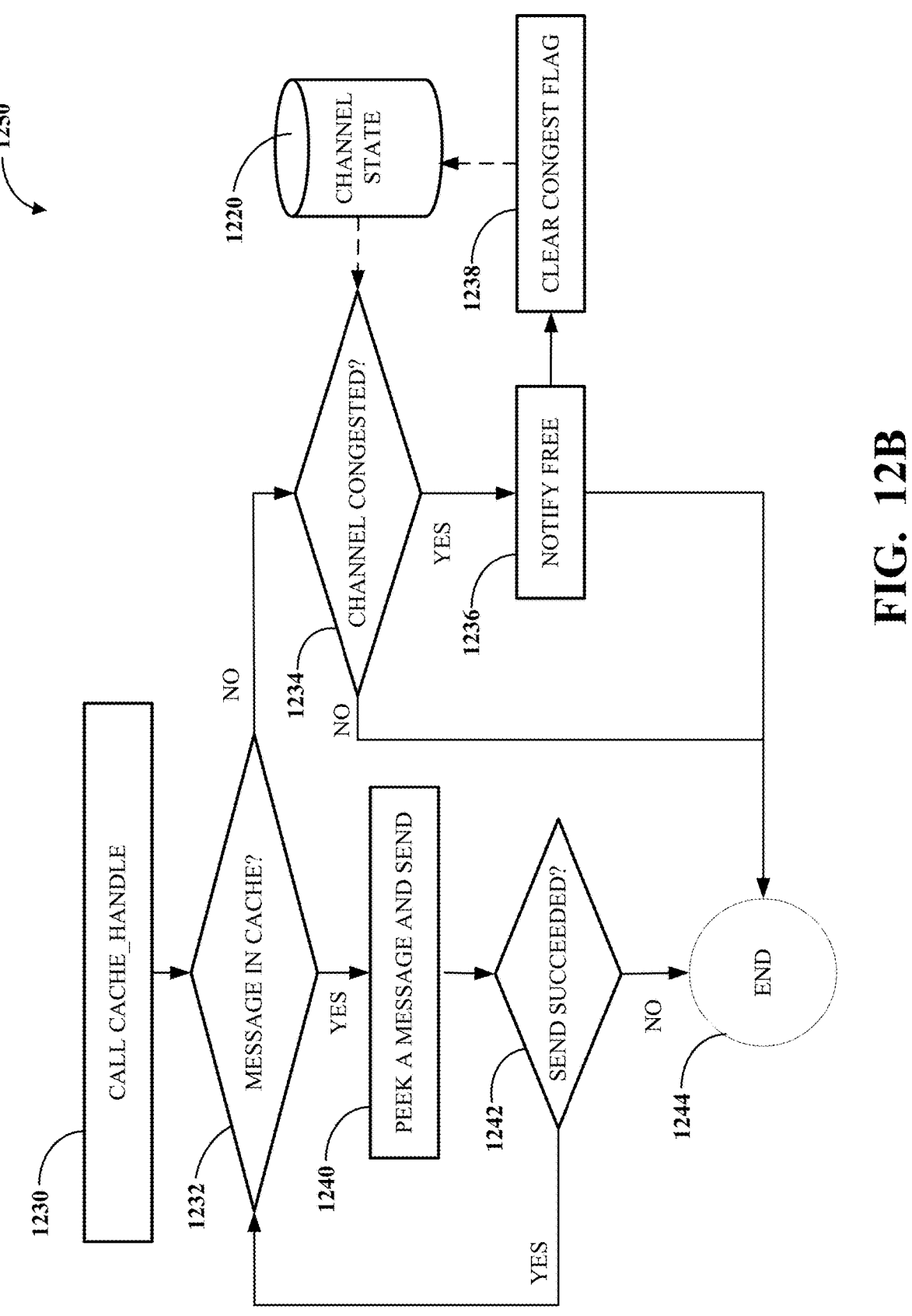
FIG. 12B is a flowchart of an example of a technique for reading packets for a call in a packet queue with a congest threshold for transmission via a shared virtual channel.
Figure 14:
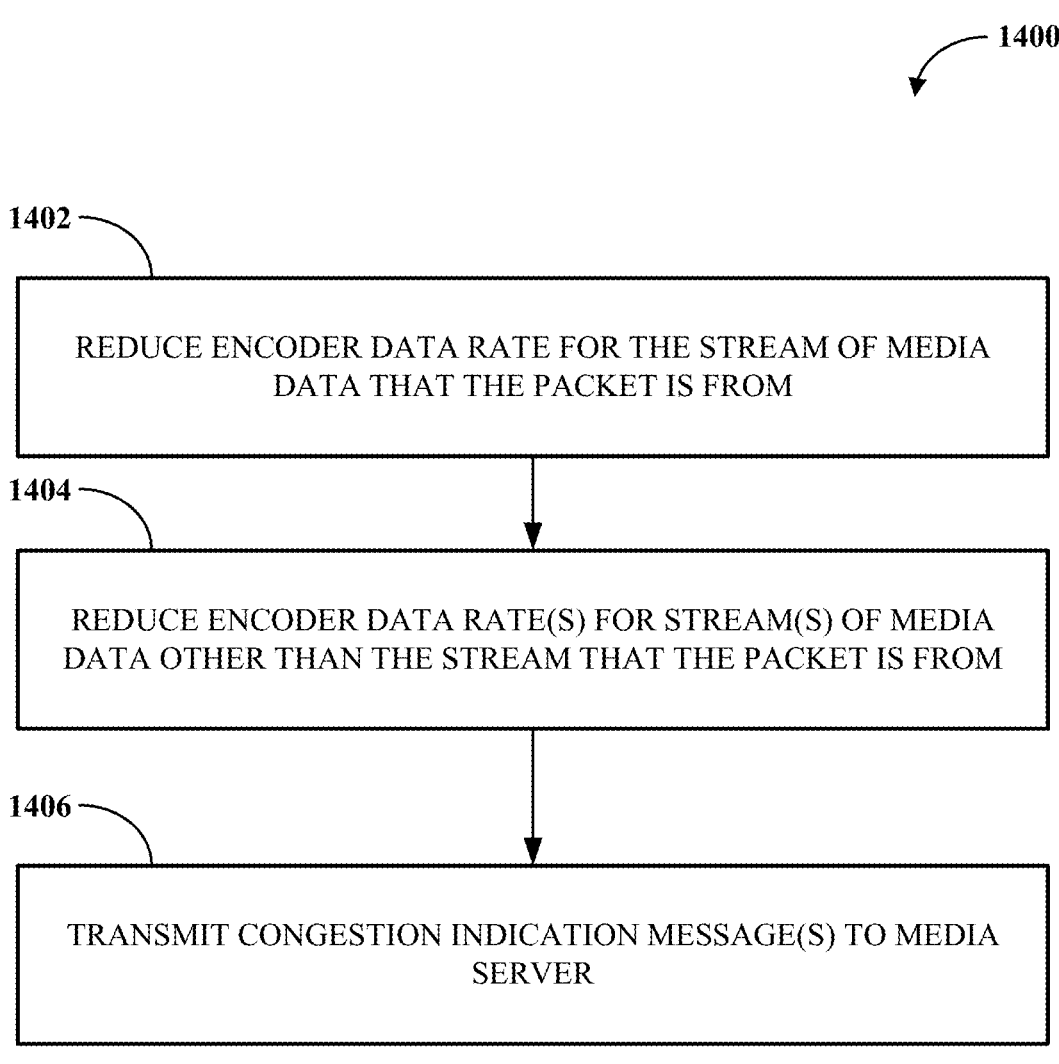
FIG. 14 is a flowchart of an example of a technique for invoking congestion mitigation measures.

To further describe implementations in greater detail, reference is next made to examples of techniques which may be performed to provide call enhancements in a virtual desktop infrastructure. FIG. 6 is a flowchart of an example of a technique 600 for selecting a media channel to support a call initiated using a virtual desktop infrastructure server. FIG. 7 is a flowchart of an example of a technique 700 for testing communications network conditions for network socket pair connections in a system configured to enable calls using a virtual desktop instance. FIG. 8 is a flowchart of an example of a technique 800 for testing communications network conditions for network socket pair connections in a system configured to enable calls using a virtual desktop instance. FIG. 9 is a flowchart of an example of a technique 900 for selecting a media channel to support a call initiated using a virtual desktop infrastructure server. FIG. 12A is a flowchart of an example of a technique for storing packets for a call in a packet queue with a congest threshold to await transmission via a shared virtual channel. FIG. 12B is a flowchart of an example of a technique for reading packets for a call in a packet queue with a congest threshold for transmission via a shared virtual channel. FIG. 13 is a flowchart of an example of a technique 1300 for transmitting packets for call from multiple streams using packet queues with a congest threshold. FIG. 14 is a flowchart of an example of a technique 1400 for invoking congestion mitigation measures.

The techniques 600, 700, 800, 900, 1200, 1300, and/or 1400 can be executed using computing devices, such as the systems, hardware, and software described with respect to FIGS. 1-5. The techniques 600, 700, 800, 900, 1200, 1300, and/or 1400 can be performed, for example, by executing a machine-readable program or other computer-executable instructions, such as routines, instructions, programs, or other code. The steps, or operations, of the techniques 600, 700, 800, 900, 1200, 1300, and/or 1400 or another technique, method, process, or algorithm described in connection with the implementations disclosed herein can be implemented directly in hardware, firmware, software executed by hardware, circuitry, or a combination thereof.

For simplicity of explanation, each of the techniques 600, 700, 800, 900, 1200, 1300, and 1400 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring to FIG. 6, the technique 600 for selecting a media channel to support a call initiated using a virtual desktop infrastructure server is shown. At 602, the technique 600 includes transmitting, using a personal computing device (e.g., the personal computing device 530), a request for a call to a virtual desktop infrastructure server (e.g., the virtual desktop infrastructure server 520). In an implementation, the request may be sent using application software (e.g., the phone agent 440 or the meeting agent 450) running over an application virtual desktop infrastructure plugin (e.g., the application VDI plugin 430) that runs on the personal computing device. The request may be received by an application virtual desktop infrastructure client (e.g., the application VDI client 414) running in a virtual desktop instance running on the virtual desktop infrastructure server. In an implementation, the request may be encapsulated in a protocol (e.g., the ICA protocol or the RDP protocol) for exchanging data for virtual desktop applications. The virtual desktop infrastructure server may in turn, responsive to the request, initiate a call via control communications with a media server (e.g., the media server 510). In an implementation, the media server may be a PBX server. As another example, the media server may be a multimedia router server. The request may be transmitted using a network interface (e.g., the network interface 214) of the personal computing device.

At 604, the technique 600 includes receiving, using the personal computing device, call parameters from the virtual desktop infrastructure server, wherein the call parameters include an identifier for the media server. The identifier for the media server may include an IP address for the media server. As another example, the identifier for the media server may include an internet domain name used by the media server. The call parameters may include other data that may be used to facilitate the setup and maintenance of the call, such as a port number to be used for transferring data of the call. In an implementation, the call parameters may be relayed via an application virtual desktop infrastructure client (e.g., the application VDI client 414) running in a virtual desktop instance running on the virtual desktop infrastructure server. The call parameters may be encapsulated in a protocol (e.g., the ICA protocol or the RDP protocol) for exchanging data for virtual desktop applications. In one example, the call parameters may be received using a network interface (e.g., the network interface 214) of the personal computing device.

At 606, the technique 600 includes testing communications network conditions for one or more network socket pair connections, such as between the personal computing device and the media server that bypasses the virtual desktop infrastructure server to obtain direct connection test results. In an implementation, the network socket pair may include sockets of a transport layer protocol (e.g., UDP, TCP, Stream Control Transmission Protocol (SCTP), or Datagram Congestion Control Protocol (DCCP)). The network socket pair may include a socket at the media server and a socket at the personal computing device that may be used to send media data between the two devices using the applicable communications network protocol. In some implementations, a socket pair is selected from designated ranges of UDP ports for the two devices being connected. In an implementation, testing communications network conditions for the network socket pair connection between the personal computing device and the media server that bypasses the virtual desktop infrastructure server may include performing a handshake test using the network socket pair connection. In an implementation, a handshake test may include an exchange of RTP Control Protocol (RTCP) packets back and forth between the personal computing device and the media server. In some implementations, the direct connection test results include a network latency metric. In some implementations, the direct connection test results include a network data throughput metric.

At 606, the technique 600 may also include testing communications network conditions for a second network socket pair connection between the personal computing device and the virtual desktop infrastructure server to obtain indirect connection test results. In an implementation, testing communications network conditions for the second network socket pair connection between the personal computing device and the virtual desktop infrastructure server may include performing a handshake test using the second network socket pair connection. In some implementations, the indirect connection test results include a network latency metric. In some implementations, the indirect connection test results include a network data throughput metric. In an implementation, at 606, testing communications network conditions for one or more network socket pair connections may include implementing the technique 700 of FIG. 7. In an implementation, at 606, testing communications network conditions for one or more network socket pair connections may include implementing the technique 800 of FIG. 8.

At 608, the technique 600 includes, based on the direct connection test results, selecting a media channel from among a set of media channels for a call initiated using the virtual desktop infrastructure server. The set of media channels includes a first media channel (e.g., the first media channel 550) using the network socket pair connection between the personal computing device and the media server and a second media channel (e.g., the second media channel 552) that is routed through the virtual desktop infrastructure server and encapsulated in a protocol (e.g., the ICA protocol or the RDP protocol) for exchanging data for virtual desktop applications. In some implementations, the set of media channels also includes a media channel (e.g., the third media channel 554) using the second network socket pair connection between the personal computing device and the virtual desktop infrastructure server. Selecting the media channel may also be based on the indirect connection test results. In an implementation, if the direct connection test results satisfy a criterion (e.g., a connection is established with acceptable throughput and/or latency), then the first media channel may be selected for use in the call. In an implementation, if the direct connection test results fail to satisfy a criterion and the indirect connection test results satisfy a criterion (e.g., a connection is established with acceptable throughput and/or latency), then the third media channel may be selected for use in the call. In an implementation, if both the direct connection test results and the indirect connection test results fail to satisfy a criterion, then the second media channel may be selected for use in the call. In some implementations, the direct connection test results are compared to the indirect connection test results and the media channel with the better connection test results is selected for use in the call. In some implementations, the set of media channels includes more media channels (e.g., direct and/or indirect media channels using different protocols for transport across a communications network) for which connection test results are determined and a media channel is selected based on these additional connection test results.

At 610, the technique 600 includes transferring media data between the media server and the personal computing device using the selected media channel to enable the call. In an implementation, the media data transferred using the selected media channel includes packets of audio data. In some implementations, the media data transferred using the selected media channel includes packets of video data. When the selected media channel is the second media channel that is routed through the virtual desktop infrastructure server and encapsulated in the protocol (e.g., ICA or RDP) for exchanging data for virtual desktop applications, the technique 600 may include merging multiple streams of media data in a single virtual channel of the protocol. In an implementation, audio streams for multiple participants in the call may be merged in a single ICA virtual channel. In some implementations, data for the call, including the media data and call control data, is transferred in a single virtual channel of the protocol (e.g., ICA or RDP). In an implementation, a single virtual channel may be used to transfer all data for the call. Merging call data of different types (e.g., media data, control data, share data) and/or from different sources (e.g., different call participants) may provide one or more benefits, such as conserving the number of virtual channels used for the call and enabling custom prioritization of call data within the call to enhance call quality. Using a media channel selected based on dynamic communications network conditions may enable a system for supporting calls with virtual desktop infrastructure to more efficiently scale while preserving or enhancing call quality.

Referring to FIG. 7, the technique 700 for testing communications network conditions for network socket pair connections in a system configured to enable calls using a virtual desktop instance is shown. At 702, the technique 700 includes testing communications network conditions for a network socket pair connection between a personal computing device (e.g., the personal computing device 530) and a media server (e.g., the media server 510) that bypasses a virtual desktop infrastructure server (e.g., the virtual desktop infrastructure server 520) to obtain direct connection test results. In an example, testing communications network conditions for the network socket pair connection between the personal computing device and the media server that bypasses the virtual desktop infrastructure server may include performing a handshake test using the network socket pair connection. In an example, a handshake test may include an exchange of RTCP packets back and forth between the personal computing device and the media server. In some implementations, the direct connection test results include a network latency metric. In some implementations, the direct connection test results include a network data throughput metric.

At 704, if the direct connection test results satisfy a criterion, then the technique 700 includes, at 706, continuing to selection of the media channel. In an example, using the first media channel 550 may be preferred, so it may be sufficient to check the direct connection test results and select, at 608, the first media channel based on the direct connection test results.

At 704, if the direct connection test results do not satisfy a criterion, then the technique 700 includes, at 708, testing communications network conditions for a second network socket pair connection between the personal computing device and the virtual desktop infrastructure server to obtain indirect connection test results. In an example, testing communications network conditions for the second network socket pair connection between the personal computing device and the virtual desktop infrastructure server may include performing a handshake test using the second network socket pair connection. In some implementations, the indirect connection test results include a network latency metric. In some implementations, the indirect connection test results include a network data throughput metric.

At 710, the technique 700 includes continuing to selection of the media channel. In an example, where the direct connection test results fail to satisfy the criterion, the indirect connection test results are also determined and checked to prepare for selecting, at 608, a media channel based on both the direct connection test results and the indirect connection test results. In an example, the indirect connection test results may be considered to select between the second media channel 552 and the third media channel 544 after the first media channel 550 has been ruled out based on the direct connection test results.

Referring to FIG. 8, the technique 800 for testing communications network conditions for network socket pair connections in a system configured to enable calls using a virtual desktop instance is shown. At 802, the technique 800 includes testing communications network conditions for a network socket pair connection between a personal computing device (e.g., the personal computing device 530) and a media server (e.g., the media server 510) that bypasses a virtual desktop infrastructure server (e.g., the virtual desktop infrastructure server 520) to obtain direct connection test results. In an example, testing communications network conditions for the network socket pair connection between the personal computing device and the media server that bypasses the virtual desktop infrastructure server may include performing a handshake test using the network socket pair connection. In an example, a handshake test may include an exchange of RTCP packets back and forth between the personal computing device and the media server. In some implementations, the direct connection test results include a network latency metric. In some implementations, the direct connection test results include a network data throughput metric.

At 804, the technique 800 includes testing communications network conditions for a second network socket pair connection between the personal computing device and the virtual desktop infrastructure server to obtain indirect connection test results. In an example, testing communications network conditions for the second network socket pair connection between the personal computing device and the virtual desktop infrastructure server may include performing a handshake test using the second network socket pair connection. In some implementations, the indirect connection test results include a network latency metric. In some implementations, the indirect connection test results include a network data throughput metric.

At 806, the technique 800 includes comparing the direct connection test results to the indirect connection test results. In an example, throughputs and/or latencies measured for the respective network socket pair connections may be compared. In some implementations, the comparison may be handicapped to favor a preferred media channel (e.g., the direct connection tests results may be enhanced for comparison where the first media channel 550 is preferred for system utilization purposes).

At 808, the technique 800 includes continuing to selection, at 608, of the media channel. In an example, at 608, the media channel may be selected based on the comparison of the direct connection test results to the indirect connection test results.

Referring to FIG. 9, the technique 900 for selecting a media channel to support a call initiated using a virtual desktop infrastructure server is shown. The technique 600 incorporates the use of timers as part of a scheme to test communications network conditions and select a media mode for a call. At 902, the technique 900 includes performing a VDI plugin detection operation. At 904, if a VDI plugin was not successfully detected, then the technique 900 includes, at 906, selecting the use of a fallback mode for media streaming for the call. In an example, a fallback mode may include running media codecs for the call on the VDI server. In this example, the VDI server may transfer media data to and/or from a personal computing device that is the user interface to the call at a full uncompressed data rate via a standard channel of a VDI protocol being used. At 904, if a VDI plugin was successfully detected, then the technique 900 includes, at 908, starting a media mode detection operation. In an example, step 908 may be a starting point for testing to determine the media mode to be used for a call. At 910, a timer (such as a 15 second timer) is started. If a complete test result is not achieved when the timer expires, then the technique 900 includes, at 906, selecting the use of the fallback mode for media streaming for the call. While the timer is still running, the technique 900 includes, at 912 trying to detect the status of a media channel that uses a UDP socket pair connection between the VDI server and the personal computing device. In an example, the techniques described in relation to step 708 in FIG. 7 may be used to test a media channel that uses a UDP socket pair connection between the VDI server and the personal computing device. When the UDP socket pair connection between the VDI server and the personal computing device is tested, a timer (such as a 1 second timer) is started and, at 914, a detection result for the media channel that uses a UDP socket pair connection between the VDI server and the personal computing device is set or stored for later use. Once the timer expires (e.g., the 1 second timer), at 916, the technique includes trying to detect the status of a direct mode media channel, which uses a more direct connection between the personal computing device and a media server supporting the call. The direct mode media channel may bypass the VDI server. In an example, the direct mode media channel may use a UDP socket pair connection between the media server and the personal computing device. In an example, the techniques described in relation to step 702 in FIG. 7 may be used to test the direct mode media channel.

At 918, if the direct mode detection test succeeded, then the technique 900 includes, at 920 selecting the use of the direct mode for media streaming for the call. In an example, the direct mode may use a UDP socket pair connection between the media server and the personal computing device to transfer media data for the call. At 918, the technique 900 includes setting a timer (such as a 1 second timer) and waiting until the timer expires to get a result. Otherwise, if the timer expires, the detection result has failed, the technique 900 proceeds to check the next option.

At 922, if the UDP mode detection test succeeded, then the technique 900 includes, at 924 selecting the use of the UDP mode for media streaming for the call. In an example, the UDP mode may use a UDP socket pair connection between the VDI server and the personal computing device to transfer media data for the call.

At 922, if the UDP mode detection test failed, then the technique 900 includes, at 926 selecting the use of an ICA mode for media streaming for the call. In an example, the ICA mode may use a virtual channel of the ICA protocol between the VDI server and the personal computing device to transfer media data for the call. The media data transferred using ICA mode, like UDP mode, and Direct mode, may be compressed to conserve network bandwidth resources. A plugin running on the personal computing device may use one or more media codecs to process media data locally, instead of relying on an application running on VDI server to perform these functions.

Figure 10:
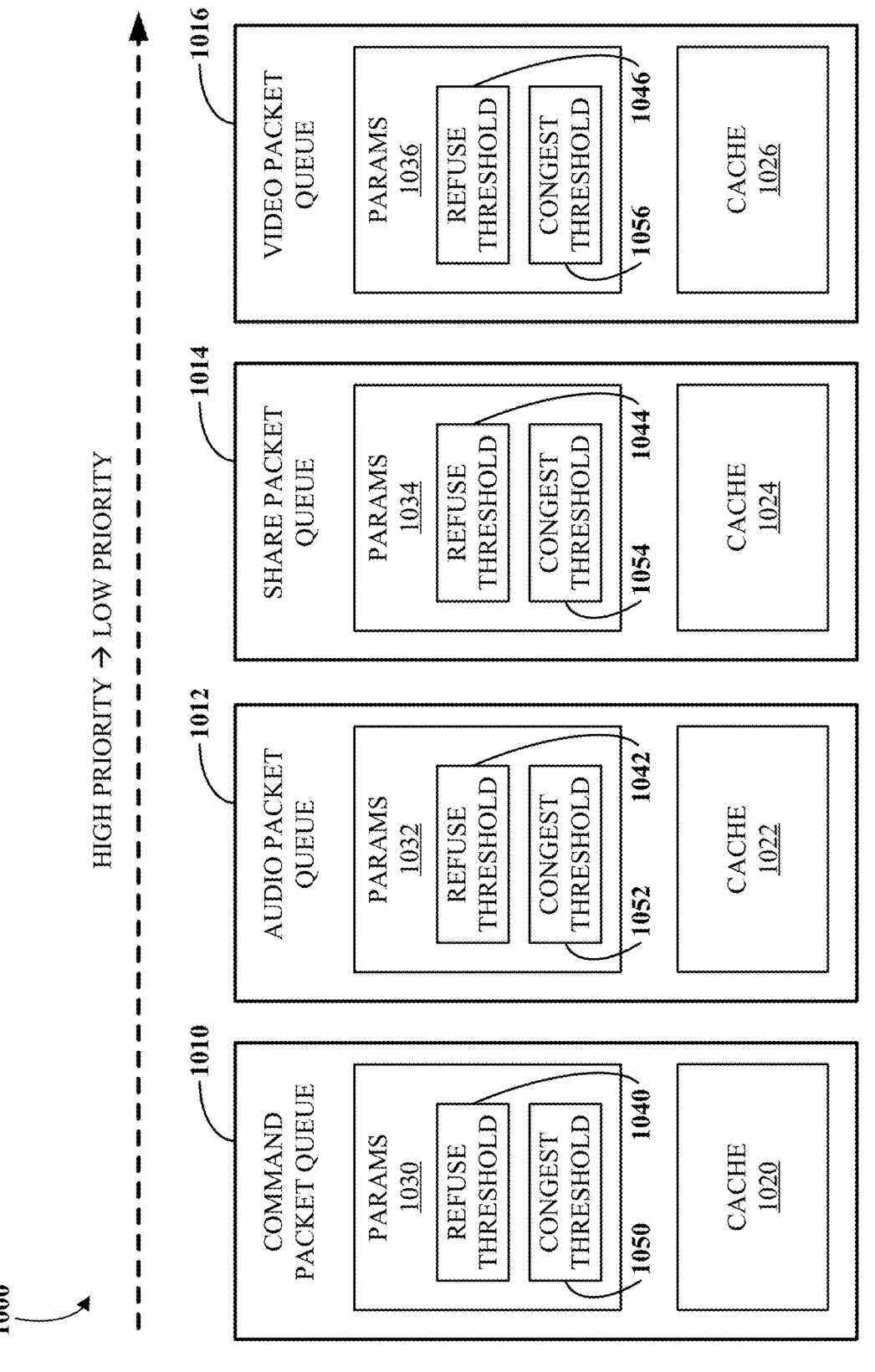
FIG. 10 is a block diagram of an example of a set of packet queues for storing packets for a call to await transmission via a single, shared virtual channel of a virtual desktop infrastructure protocol.

FIG. 10 is a block diagram of an example of a set of packet queues 1000 for storing packets for a call to await transmission via a single, shared virtual channel of a virtual desktop infrastructure protocol. The set of packet queues 1000 includes a command packet queue 1010, an audio packet queue 1012, a share packet queue 1014, and a video packet queue 1016. In an example, the command packet queue 1010, the audio packet queue 1012, the share packet queue 1014, and the video packet queue 1016 may be thread safe data queues that each hold different data types. The command packet queue 1010 may store command and control signal data for a conference call. The audio packet queue 1012 may store audio data from an audio stream for a conference call. The share packet queue 1014 may store share data (e.g., data conveying a shared screen in a conference call) from a share stream for a conference call. The video packet queue 1016 may store video data from a video stream for a conference call.

The data for transmission may be stored in the cache (1020, 1022, 1024, and 1026) allocated for each packet queue (1010, 1012, 1014, and 1016) while it awaits transmission via a shared virtual channel. The data stored in caches (1020, 1022, 1024, and 1026) may be organized into portions that will be transmitted together across the virtual channel. In some implementations, a packet of data (e.g., audio data) may be stored in the cache (e.g., the cache 1022) as a complete packet with all layers of headers and that will be encoded in the virtual channel. In some implementations, protocol headers are added to packets when they are pulled from the packet buffers for transmission after being stored. In an example, a packet of data (e.g., video data) may be stored in the cache (e.g., the cache 1026) as a packet with less than all layers of headers and that will be encoded in the virtual channel. In an example, a packet of data (e.g., share data) may be stored in the cache (e.g., the cache 1024) as a packet payload of data without all the headers that will be encoded in the virtual channel.

Each of the packet queues (1010, 1012, 1014, and 1016) is associated with respective parameters (1030, 1032, 3034, and 3036). In an example, the parameters (1030, 1032, 3034, and 3036) may be stored as part of the respective packet queues (1010, 1012, 1014, and 1016) or in a data structure that is linked to the respective packet queues (1010, 1012, 1014, and 1016). In this example, the packet queues (1010,

1012, 1014, and 1016) are associated with respective congest thresholds (1050, 1052, 1054, and 1056) and with respective refuse thresholds (1040, 1042, 1044, and 1046). The congest thresholds (1050, 1052, 1054, and 1056) and the respective refuse thresholds (1040, 1042, 1044, and 1046) may be compared to fill levels for their respective packet queues (1010, 1012, 1014, and 1016) to determine when to take certain actions related to quality service. In an example, when a fill level of a packet queue (e.g., the packet queue 1016) exceeds its respective congest thresholds (e.g., the congest threshold 1056), one or more congestion mitigation measures may be invoked. In an example, the congest thresholds (1050, 1052, 1054, and 1056) and the refuse thresholds (1040, 1042, 1044, and 1046) may be used as described in relation to FIG. 11.

In some implementations, each data queue may be independently configured with its own congest threshold and refuse threshold. Table 1 below lists examples of refuse thresholds and congest thresholds for four data queues for respective data streams for a conference call that share a virtual channel (e.g., an ICA virtual channel) to transfer data between a thin client running a conference call plugin and a VDI server running the conference client software.

TABLE 1

|  | command | audio | share | video |
|---|---|---|---|---|
| refuse threshold | 300 bytes | 100 bytes | 200 bytes | 200 bytes |
| congest threshold | 150 bytes | 50 bytes | 100 bytes | 100 bytes |

In some implementations (not shown in FIG. 10), additional packet queues may be used to merge additional types and/or streams of data for a call into the shared virtual channel. In an example, a packet queue may be used for chat data or other types of data supporting a conference call. In an example, a device may separately buffer data from media streams for additional channels of audio (e.g., for stereo audio). In an example, a device may forward and separately buffer data from media streams for other remote participants in the conference call.

A prioritization scheme may be used to select which of the packet queues using the shared virtual channel will have a packet transmitted next. For example, transmitting a packet in the shared virtual channel may include selecting amongst a set of packet queues, including the first packet queue and the second packet queue, based on priorities of packet queues in the set of packet queues. A packet from the selected packet queue may then be transmitted in the single virtual channel. In an example, the packet queue with the highest priority level that has a packet available may be selected for the next packet transmission.

FIG. 11 is an illustration of an example of a packet queue 1100 with a refuse threshold 1120 and a congestion threshold 1130. The packet queue 1100 includes a cache 1110 that stores the data of the packets as they await transmission via a virtual channel (e.g., an ICA virtual channel). The packet queue 1100 is associated with a refuse threshold 1120 that indicates a fill level above which packets of this stream passing through the packet queue 1100 should be dropped. The packet queue 1100 is associated with a congest threshold 1130 that indicates a fill level above which one or more congestion mitigation measures should be invoked. The refuse threshold 1120 and the congestion threshold 1130 may be compared to the fill level 1140, which reflects a current amount of data that is stored in the cache 1110 to await transmission. The fill level 1140, the refuse threshold 1120, and the congestion threshold 1130 may be encoded in various units. For example, the fill level 1140, the refuse threshold 1120, and the congestion threshold 1130 may be encoded in the units of a number of packets. For example, the fill level 1140, the refuse threshold 1120, and the congestion threshold 1130 may be encoded in the units of a number of bytes of data. In an example, the fill level 1140 may be compared to the refuse threshold 1120 and/or the congestion threshold 1130 when a packet is to be added into the packet queue 1100. In an example, the fill level 1140 may be compared to the congestion threshold 1130 when a packet is to be removed or pulled/popped from the packet queue 1100 for transmission to determine if a previously invoked congestion mitigation measure should be ended.

In an example, if the fill level 1140 is above the refuse threshold 1120, an incoming data packet may be rejected. In some implementations, if the fill level 1140 is above the refuse threshold, one or more of the oldest packets may be dropped/deleted before transmission and the new packet may be stored in the cache 1110. In an example, if the fill level 1140 is above the congest threshold 1130, congestion handling will be triggered.

FIGS. 12A and 12B show techniques that may be used to manage packet queues in a thread safe manner for merging streams in a virtual channel for call enhancement in a virtual desktop infrastructure. The technique 1200 of FIG. 12A may be used store packets from a stream of media data for a call that will be transmitted via a virtual channel shared with other streams for the call. The technique 1250 of FIG. 12B may be used to read packets from the queue for transmission via the shared virtual channel when communication capacity for the stream becomes available in the shared virtual channel. In some implementations, the technique 1200 and the technique 1250 may performed by different threads that share access to a channel state 1220.

Referring to FIG. 12A, the technique 1200 for storing packets for a call in a packet queue with a congest threshold to await transmission via a shared virtual channel is shown. At 1210, a send data routine is called by a conference call process (e.g., a process running on the personal computing device 530). A packet of data (e.g., with or without various protocol headers) is passed in with this send data routine call. In an example, the packet of data may include command data, audio data, share data, or video data.

At 1212, a comparison is made between the cache size (e.g., the fill level 1140) of a packet queue (e.g., the packet queue 1000) that the data packet must pass through and an associated refuse threshold. Where that comparison indicates that the cache size is greater than the refuse threshold, the technique 1200 proceeds to 1214 at which the send data routine fails and the packet of data is dropped. However, where the comparison indicates that the cache size is not greater than the refuse threshold, the technique 1200 proceeds to 1216.

At 1216, a comparison is made between the cache size of the packet queue and an associated congest threshold. Where that comparison indicates that the cache size is not greater than an associated congest threshold, the technique 1200 proceeds to 1226 at which the data packet is added to the cache of the packet queue. However, where the comparison indicates that the cache size is greater than an associated congest threshold, the technique 1200 proceeds to 1218.

At 1218, the channel state 1220 is checked to determine whether the channel state 1220 indicates the media channel for the call was already in a congest state. Where the channel state 1220 indicates the media channel for the call was already in a congest state, the technique 1200 proceeds to 1226 at which the data packet is added to the cache of the packet queue. However, where the channel state 1220 indicates the media channel for the call was not already in a congest state, the technique 1200 proceeds to 1222, at which a congest notification is issued which may serve to invoke one or more congestion mitigation measures (e.g., decreasing a media encoder data rate or sending a congestion message to a remote device in the call, such as a media server). In an example, the technique 1400 of FIG. 14 may be implemented in response to the notification of congestion at 1222.

After a congest notification is issued at 1222, the technique 1200 proceeds to 1224, at which a congest flag is set in the channel state 1220 to indicate an ongoing congest state. The technique 1200 also proceeds to 1226, at which the data packet is added to the cache of the packet queue. At 1228, the data send routine returns with success.

Referring to FIG. 12B, the technique 1250 for reading packets for a call in a packet queue with a congest threshold for transmission via a shared virtual channel is shown. At 1230, a cache handle routine is called by a conference call process (e.g., a process of the application VDI plugin 432 running on the personal computing device 530).

At 1232, the cache is checked to determine whether there are packets of data available for transmission. Where there are no packets of data available in the cache, the technique 1250 proceeds to 1234. Where a packet of data is available in the cache, the technique 1250 proceeds to 1240, at which the oldest message in the cache is transmitted via a shared virtual channel (e.g., an ICA channel) to a VDI server (e.g., the VDI server 520) for forwarding to a media server (e.g., the media server 510).

At 1234, the channel state 1220 is checked to determine whether the channel state 1220 indicates the media channel for the call was in a congest state. Where the channel state 1220 indicates the media channel for the call was in a congest state, the technique 1250 proceeds to 1236, at which a notification that the media channel is free of congestion is issued.

After a notification is issued at 1236, the technique 1250 proceeds to 1238, at which the congest flag of the channel state 1220 is cleared to indicate a lack of congestion. The technique 1250 also proceeds to 1244, at which the cache handle routine ends.

At 1242, a check is performed to determine whether the packet of data was successfully sent. Where the packet of data was successfully sent, the technique 1250 returns to 1232 to check for any additional packets of data in the cache. However, where the packet of data was not sent successfully (e.g., error message returned or timeout), the technique 1250 proceeds to 1244, at which the cache handle routine ends.

Referring to FIG. 13, the technique 1300 for transmitting packets for a call from multiple streams using packet queues (e.g., the set of packet queues 1000) with a congest threshold is shown. At 1302, the technique 1300 includes opening a media channel (e.g., the second media channel 552) between a personal computing device (e.g., the personal computing device 530) and a media server (e.g., the media server 510) for a call initiated using a virtual desktop infrastructure server (e.g., the virtual desktop infrastructure server 520). The media channel is routed through the virtual desktop infrastructure server and encapsulated in a protocol (e.g., ICA or RDP) for exchanging data for virtual desktop applications. Opening the media channel may include starting one or more transport layer sessions (e.g., a UDP session or a TCP session) between the virtual desktop infrastructure server and the media server to transfer packets of media data (e.g., audio data, share data, or video data). Opening the media channel may also include starting one or more virtual channels (e.g., an ICA virtual channel) between the virtual desktop infrastructure server and the personal computing device to transfer packets of media data. In an example, the media server may be a PBX server.

At 1304, the technique 1300 includes merging packet streams of media data for the call in a single virtual channel (e.g., an ICA virtual channel) of the protocol using respective packet queues to store packets of the respective streams to await transmission via the single virtual channel. In an example, the technique 1300 may include merging a first stream of media data for the call with a second stream of media data for the call in a single virtual channel of the protocol using a first packet queue (e.g., the audio packet queue 1012) to store packets of the first stream and a second packet queue (e.g., the share packet queue) to store packets of the second stream (e.g., as the packets await transmission via the single virtual channel). The first packet queue is associated with a first congest threshold. In some implementations, the second packet queue is associated with a second congest threshold. Data for the call of many types may be transferred in the single virtual channel by implementing the technique 1300 using one or more packet queues for each data type. In an example, the technique 1300 may include transferring data for the call, including the media data and call control data, in the single virtual channel of the protocol. In some implementations, the single virtual channel is used to transfer all data for the call.

At 1306, the technique 1300 includes pushing a packet of media data of a stream into the respective packet queue for the stream. In an example, the technique 1300 may include pushing a first packet of media data of the first stream into the first packet queue.

At 1308, the technique 1300 includes comparing a fill level of the respective packet queue to a congest threshold associated with the respective packet queue. In an example, the technique 1300 may include comparing a fill level of the first packet queue to the first congest threshold. In an example, the fill level and the congest threshold may be encoded in various units (e.g., number of packets or number of bytes).

Where, at 1310, the fill level exceeds the congest threshold, the technique 1300 proceeds to 1312, at which a congestion mitigation measure is invoked responsive to the fill level exceeding the first congest threshold. In an example, the congestion mitigation measure may include reducing an encoder data rate for the first stream of media data. In some implementations, the congestion mitigation measure may include reducing an encoder data rate for the second stream of media data, which is a different stream of media data than the stream of the first packet (e.g., a lower priority media stream). In an example, the congestion mitigation measure may include transmitting a congestion indication message to the media server (e.g., the media server 510). In an example, the congestion indication message may cause the media server to adjust an encode data rate of one or more streams of the call and/or disable services of the call. In some implementations, more than one congestion mitigation measure is invoked. In an example, the technique 1400 of FIG. 14 may be implemented to invoke multiple congestion mitigation measures.

Where, at 1310, the fill level does not exceed the congest threshold or after invoking the congestion mitigation measure at 1312, the technique 1300 continues at 1306 by pushing a next packet of data of the call for transmission into its respective packet queue. In an example, the technique

1300 may include, at 1306, pushing a second packet of media data of the second stream into the second packet queue, at 1308, comparing a fill level of the second packet queue to the second congest threshold, and, at 1312, invoking a congestion mitigation measure responsive to the fill level exceeding the second congest threshold.

Referring to FIG. 14 the technique 1400 for invoking congestion mitigation measures is shown. At 1402, the technique 1400 includes reducing an encoder data rate for a first stream of media data from which the packet that triggered the congestion event is drawn. At 1404, the technique 1400 includes reducing an encoder data rate for one or more streams of media data that are different from the stream that from which the packet that triggered the congestion event is drawn. In an example, a stream with a lower priority than the first stream may have its encoder data rate reduced at 1404. In some implementations, all streams with a lower priority than the first stream have their encoder data rates reduced. In some implementations, all media streams of the call have their encoder data rates reduced.

At 1406, a congestion indication message is transmitted to the media server (e.g., the media server 510). In an example, the congestion indication message may cause the media server to adjust an encode data rate of one or more streams of the call and/or disable services of the call. The technique 1400 may be modified to include additional congestion mitigation measures, such as sending a congestion message to the virtual desktop infrastructure server (e.g., the virtual desktop infrastructure server 520).

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
opening, by a client device, a channel for a call initiated using a virtual desktop infrastructure server;
merging, at the client device, a first stream for the call with a second stream for the call in a single virtual channel using a first packet queue to store packets of the first stream and a second packet queue to store packets of the second stream, wherein the first packet queue is associated with a first congest threshold, and wherein the single virtual channel is part of a protocol for exchanging data for virtual desktop applications and the first stream and the second stream include at least two different types of media data including audio data, video data, control data, or share data;
determining a fill level of the first packet queue exceeds the first congest threshold; and
responsive to determining the fill level of the first packet queue exceeds the first congest threshold, invoking, by the client device, a congestion mitigation measure that selectively reduces a transmission rate of the first stream or the second stream into the single virtual channel based on a priority level of a respective stream.

2. The method of claim 1, wherein the congestion mitigation measure comprises:
reducing an encoder data rate for the first stream.

3. The method of claim 1, wherein the congestion mitigation measure comprises:
reducing an encoder data rate for a second stream.

4. The method of claim 1, wherein the congestion mitigation measure comprises:
transmitting a congestion indication message to a media server.

5. The method of claim 1, comprising:
transferring data for the call, including media data and call control data, in the single virtual channel of the protocol.

6. The method of claim 1, comprising:
pushing a first packet of media data of the first stream into the first packet queue.

7. The method of claim 1, comprising:
pushing a second packet of media data of the second stream into the second packet queue associated with a second congest threshold;
determining a fill level of the second packet queue exceeds the second congest threshold; and
responsive to determining the fill level of the second packet queue exceeds the second congest threshold, invoking, by the client device, the congestion mitigation measure.

8. The method of claim 1, comprising:
selecting amongst a set of packet queues, including the first packet queue and the second packet queue, based on priorities of packet queues in the set of packet queues; and
transmitting a packet from the selected packet queue in the single virtual channel.

9. A personal computing device, comprising:
a network interface,
a processor, and
a memory, wherein the memory stores instructions executable by the processor to:
open, by a client device, a channel for a call initiated using a virtual desktop infrastructure server;
merge, at the client device, a first stream for the call with a second stream for the call in a single virtual channel using a first packet queue to store packets of the first stream and a second packet queue to store packets of the second stream, wherein the first packet queue is associated with a first congest threshold, and wherein the single virtual channel is part of a protocol for exchanging data for virtual desktop applications and the first stream and the second stream include at least two different types of media data including audio data, video data, control data, or share data;
determine a fill level of the first packet queue exceeds the first congest threshold; and
responsive to determining the fill level of the first packet queue exceeds the first congest threshold, invoke, by the client device, a congestion mitigation measure that selectively reduces a transmission rate of the first stream or the second stream into the single virtual channel based on a priority level of a respective stream.

10. The personal computing device of claim 9, wherein the congestion mitigation measure comprises reducing an encoder data rate for the first stream.

11. The personal computing device of claim 9, wherein the congestion mitigation measure comprises reducing an encoder data rate for the second stream.

12. The personal computing device of claim 9, wherein the congestion mitigation measure comprises transmitting a congestion indication message to a media server.

13. The personal computing device of claim 9, wherein the memory stores instructions executable by the processor to:
transfer data for the call, including media data and call control data, in the single virtual channel of the protocol.

14. The personal computing device of claim 9, comprising:

pushing a first packet of media data of the first stream into the first packet queue.

15. The personal computing device of claim 9, wherein the memory stores instructions executable by the processor to:

push a second packet of media data of the second stream into the second packet queue;

determine a fill level of the second packet queue exceeds a second congest threshold; and responsive to determining the fill level of the second packet queue exceeds the second congest threshold, invoke, by the client device, the congestion mitigation measure.

16. The personal computing device of claim 9, wherein the memory stores instructions executable by the processor to:

select amongst a set of packet queues, including the first packet queue and the second packet queue, based on priorities of packet queues in the set of packet queues; and transmit a packet from the selected packet queue in the single virtual channel.

17. A non-transitory computer-readable storage medium, comprising executable instructions that, when executed by a processor, facilitate performance of operations, comprising:

opening, by a client device, a channel for a call initiated using a virtual desktop infrastructure server;

merging, at the client device, a first stream for the call with a second stream for the call in a single virtual channel using a first packet queue to store packets of the first stream and a second packet queue to store packets of the second stream, wherein the first packet queue is associated with a first congest threshold, and wherein the single virtual channel is part of a protocol for exchanging data for virtual desktop applications and the first stream and the second stream include at least two different types of media data including audio data, video data, control data, or share data;

determining a fill level of the first packet queue exceeds the first congest threshold; and responsive to determining the fill level of the first packet queue exceeds the first congest threshold, invoking, by the client device, a congestion mitigation measure that selectively reduces a transmission rate of the first stream or the second stream into the single virtual channel based on a priority level of a respective stream.

18. The non-transitory computer-readable storage medium of claim 17, comprising transferring data for the call, including media data and call control data, in the single virtual channel of the protocol.

19. The non-transitory computer-readable storage medium of claim 17, comprising:

pushing a first packet of media data of the first stream into the first packet queue.

20. The non-transitory computer-readable storage medium of claim 17, comprising:

pushing a second packet of media data of the second stream into the second packet queue associated with a second congest threshold;

determining a fill level of the second packet queue exceeds the second congest threshold; and responsive to determining the fill level of the second packet queue exceeds the second congest threshold, invoking, by the client device, the congestion mitigation measure.

* * * * *